(12) United States Patent
Kwon et al.

(10) Patent No.: US 9,560,650 B2
(45) Date of Patent: Jan. 31, 2017

(54) METHOD OF TRANSMITTING DATA IN A MOBILE COMMUNICATION SYSTEM

(71) Applicant: EVOLVED WIRELESS LLC, Austin, TX (US)

(72) Inventors: Yeong Hyeon Kwon, Anyang-si (KR); Seung Hee Han, Anyang-si (KR); Hyun Hwa Park, Anyang-si (KR); Dong Cheol Kim, Anyang-si (KR); Hyun Woo Lee, Anyang-si (KR); Min Seok Noh, Anyang-si (KR)

(73) Assignee: EVOLVED WIRELESS LLC, Austin, TX (US)

( * ) Notice: Subject to any disclaimer, the term of this patent is extended or adjusted under 35 U.S.C. 154(b) by 0 days.

(21) Appl. No.: 14/986,327

(22) Filed: Dec. 31, 2015

(65) Prior Publication Data
US 2016/0113012 A1    Apr. 21, 2016

Related U.S. Application Data

(63) Continuation of application No. 14/700,473, filed on Apr. 30, 2015, now Pat. No. 9,241,349, which is a
(Continued)

(30) Foreign Application Priority Data

Jun. 9, 2006    (KR) .......................... 10-2006-0052167
Jun. 26, 2006   (KR) .......................... 10-2006-0057488

(51) Int. Cl.
*G06F 15/16*    (2006.01)
*H04W 72/04*    (2009.01)
(Continued)

(52) U.S. Cl.
CPC ...... *H04W 72/0446* (2013.01); *H04J 13/0059* (2013.01); *H04J 13/107* (2013.01);
(Continued)

(58) Field of Classification Search
CPC ........................................................ H04L 29/06
(Continued)

(56) References Cited

U.S. PATENT DOCUMENTS 5,319,374 A    6/1994  Desai et al.
5,642,355 A    6/1997  Smith
(Continued)

FOREIGN PATENT DOCUMENTS

CN    1437416 A    8/2003
CN    1596020 A    3/2005
(Continued)

OTHER PUBLICATIONS

U.S. Appl. No. 14/688,195, filed Apr. 16, 2015, Kwon et al.
(Continued)

*Primary Examiner* — Shripal Khajuria
(74) *Attorney, Agent, or Firm* — Jason H. Vick; Sheridan Ross, PC

(57) ABSTRACT

Disclosed is a data transmission method in a mobile communication system. The data transmission method through a code sequence in a mobile communication system includes grouping input data streams into a plurality of blocks consisting of at least one bit so as to map each block to a corresponding signature sequence, multiplying a signature sequence stream, to which the plurality of blocks are mapped, by a specific code sequence, and transmitting the signature sequence stream multiplied by the specific code sequence to a receiver.

24 Claims, 22 Drawing Sheets

Related U.S. Application Data continuation of application No. 14/020,537, filed on Sep. 6, 2013, now Pat. No. 9,037,736, which is a continuation of application No. 13/489,408, filed on Jun. 5, 2012, now Pat. No. 8,683,058, which is a continuation of application No. 12/303,947, filed as application No. PCT/KR2007/002784 on Jun. 8, 2007, now Pat. No. 8,218,481.

(51) Int. Cl.
| | |
|---|---|
| *H04J 13/00* | (2011.01) |
| *H04J 13/10* | (2011.01) |
| *H04J 13/22* | (2011.01) |
| *H04L 5/00* | (2006.01) |
| *H04L 27/26* | (2006.01) |
| *H04W 74/08* | (2009.01) |
| *H04L 25/02* | (2006.01) |

(52) U.S. Cl.
CPC ............ *H04J 13/22* (2013.01); *H04L 5/0016* (2013.01); *H04L 5/0044* (2013.01); *H04L 5/0053* (2013.01); *H04L 5/0092* (2013.01); *H04L 27/2605* (2013.01); *H04W 72/0453* (2013.01); *H04W 74/0833* (2013.01); *H04L 25/0226* (2013.01); *H04L 27/2655* (2013.01)

(58) Field of Classification Search
USPC .......................................... 709/228
See application file for complete search history.

(56) References Cited

U.S. PATENT DOCUMENTS

| | | |
|---|---|---|
| 5,673,259 A | 9/1997 | Quick, Jr. |
| 5,914,947 A | 6/1999 | Saito |
| 6,738,638 B1 | 5/2004 | Moulsley |
| 6,795,420 B1 | 9/2004 | Moulsley et al. |
| 7,047,009 B2 | 5/2006 | Laroia et al. |
| 7,050,513 B1 | 5/2006 | Yakhnich |
| 7,292,641 B2 | 11/2007 | Suh et al. |
| 7,292,665 B2 | 11/2007 | Eglit |
| 7,349,371 B2 | 3/2008 | Schein et al. |
| 7,424,067 B2 | 9/2008 | Vanderperren et al. |
| 7,426,175 B2 | 9/2008 | Zhuang et al. |
| 7,433,418 B1 | 10/2008 | Dogan et al. |
| 7,447,504 B2 | 11/2008 | Lohr et al. |
| 7,496,113 B2 | 2/2009 | Cai et al. |
| 7,570,618 B2 | 8/2009 | Son et al. |
| 7,580,400 B2 | 8/2009 | Sung et al. |
| 7,590,183 B2 | 9/2009 | Yonge, III et al. |
| 7,599,327 B2 | 10/2009 | Zhuang |
| 7,623,439 B2 | 11/2009 | Webster et al. |
| 7,664,076 B2 | 2/2010 | Kim et al. |
| 7,675,841 B2 | 3/2010 | Suh et al. |
| 7,693,517 B2 | 4/2010 | Etemad et al. |
| 7,701,919 B2 | 4/2010 | Ah Lee |
| 7,702,028 B2 | 4/2010 | Zhou et al. |
| 7,768,965 B2 | 8/2010 | Kwon et al. |
| 7,894,396 B2 | 2/2011 | Noh et al. |
| 7,961,696 B2 | 6/2011 | Ma et al. |
| 7,995,967 B2 | 8/2011 | Li et al. |
| 8,000,305 B2 | 8/2011 | Tan et al. |
| 8,098,745 B2 | 1/2012 | Bertrand et al. |
| 8,116,195 B2 | 2/2012 | Hou et al. |
| 8,121,045 B2 | 2/2012 | Cai et al. |
| 8,131,295 B2 | 3/2012 | Wang et al. |
| 8,180,058 B2 | 5/2012 | Kitazoe |
| 8,199,730 B2 | 6/2012 | Ou et al. |
| 8,218,481 B2 | 7/2012 | Kwon et al. |
| 8,422,427 B2 | 4/2013 | Kwon et al. |
| 8,448,037 B2 | 5/2013 | Bergquist et al. |
| 8,683,058 B2 | 3/2014 | Kwon et al. |
| 9,037,736 B2 | 5/2015 | Kwon et al. |
| 9,094,202 B2 | 7/2015 | Maheshwari et al. |
| 9,204,468 B2 | 12/2015 | Tynderfeldt et al. |
| 9,241,349 B2 | 1/2016 | Kwon et al. |
| 2002/0114297 A1 | 8/2002 | Karna et al. |
| 2002/0160781 A1 | 10/2002 | Bark et al. |
| 2003/0072255 A1 | 4/2003 | Ma et al. |
| 2003/0095528 A1 | 5/2003 | Halton et al. |
| 2004/0157602 A1 | 8/2004 | Khawand |
| 2004/0162075 A1 | 8/2004 | Malladi et al. |
| 2004/0214590 A1 | 10/2004 | Al-Housami et al. |
| 2005/0084030 A1 | 4/2005 | Zhou et al. |
| 2005/0180353 A1 | 8/2005 | Hansen et al. |
| 2005/0213689 A1 | 9/2005 | Matsuda et al. |
| 2005/0259567 A1 | 11/2005 | Webster et al. |
| 2005/0265222 A1 | 12/2005 | Gerlach |
| 2005/0286409 A1 | 12/2005 | Yoon et al. |
| 2006/0018336 A1 | 1/2006 | Sutivong et al. |
| 2006/0126570 A1* | 6/2006 | Kim .................. H04J 13/0025 370/335 |
| 2006/0140217 A1 | 6/2006 | Jung et al. |
| 2006/0153282 A1 | 7/2006 | Jung et al. |
| 2006/0212774 A1 | 9/2006 | Lee et al. |
| 2006/0268772 A1 | 11/2006 | Ko et al. |
| 2006/0274843 A1 | 12/2006 | Koo et al. |
| 2007/0064665 A1 | 3/2007 | Zhang et al. |
| 2007/0110172 A1 | 5/2007 | Faulkner et al. |
| 2007/0123257 A1 | 5/2007 | Noll et al. |
| 2007/0165567 A1 | 7/2007 | Tan et al. |
| 2007/0253465 A1 | 11/2007 | Muharemovic et al. |
| 2007/0270273 A1 | 11/2007 | Fukuta et al. |
| 2007/0291696 A1 | 12/2007 | Zhang et al. |
| 2008/0101306 A1 | 5/2008 | Bertrand et al. |
| 2008/0130588 A1 | 6/2008 | Jeong et al. |
| 2008/0192678 A1 | 8/2008 | Bertrand et al. |
| 2009/0163211 A1 | 6/2009 | Kitazoe et al. |
| 2010/0034155 A1 | 2/2010 | Noh et al. |

FOREIGN PATENT DOCUMENTS

| | | |
|---|---|---|
| CN | 1773989 | 5/2006 |
| EP | 1404079 | 3/2004 |
| EP | 1469697 A2 | 10/2004 |
| EP | 1592192 | 11/2005 |
| EP | 1681821 | 7/2006 |
| EP | 1794971 B1 | 3/2010 |
| EP | 1787414 B1 | 1/2012 |
| JE | 1126737 | 8/2001 |
| JE | 1594260 | 11/2005 |
| JP | 04-035332 | 6/1992 |
| JP | 11-154929 | 6/1999 |
| JP | 2000-102067 | 4/2000 |
| JP | 2000-324139 | 11/2000 |
| JP | 2001-268051 | 9/2001 |
| JP | 2003-179576 | 6/2003 |
| JP | 2004-512728 | 4/2004 |
| JP | 2004-274794 | 9/2004 |
| JP | 2005-260337 | 9/2005 |
| KR | 10-1997-0063982 | 9/1997 |
| KR | 10-2000-0033356 | 6/2000 |
| KR | 10-2001-0082697 | 8/2001 |
| KR | 10-2004-0087324 | 10/2004 |
| KR | 10-2005-0053714 | 6/2005 |
| KR | 10-2005-0122756 | 12/2005 |
| KR | 10-2006-0047736 | 5/2006 |
| KR | 10-2006-0060487 | 6/2006 |
| KR | 10-2006-0066595 | 6/2006 |
| KR | 10-2006-0093002 | 8/2006 |
| KR | 10-062668 | 9/2006 |
| KR | 10-2006-0121449 | 11/2006 |
| KR | 10-2008-0013349 | 2/2008 |
| KR | 10-0937422 | 1/2010 |
| KR | 10-1259115 | 4/2013 |
| WO | WO 96/37079 | 11/1996 |
| WO | WO 98/48586 | 10/1998 |
| WO | WO 00/36761 | 6/2000 |
| WO | WO 01/11909 | 2/2001 |
| WO | WO 01/59950 | 8/2001 |
| WO | WO 02/33841 | 4/2002 |
| WO | WO 03/075497 | 9/2003 |

(56) References Cited

FOREIGN PATENT DOCUMENTS

| | | |
|---|---|---|
| WO | WO 2004/030392 | 4/2004 |
| WO | WO 2004/032368 | 4/2004 |
| WO | WO 2005/011128 | 2/2005 |
| WO | WO 2005/022760 | 3/2005 |
| WO | WO 2005/022761 | 3/2005 |
| WO | WO 2005/043791 | 5/2005 |
| WO | WO 2005/055527 | 6/2005 |
| WO | WO 2005/088882 | 9/2005 |
| WO | WO 2005/112323 | 11/2005 |
| WO | WO 2005/122628 | 12/2005 |
| WO | WO 2006/015108 | 2/2006 |
| WO | WO 2006/023536 | 3/2006 |
| WO | WO 2007/082409 | 7/2007 |
| WO | WO 2007/138453 | 12/2007 |

OTHER PUBLICATIONS

3GPP TR 25.913 V7.3.0 "3rd Generation Partnership Project; Technical Specification Group Radio Access Network; Requirements for Evolved UTRA (E-UTRA) and Evolved UTRAN (E-UTRAN)" (Release 7), Mar. 2006.
Chang, Y. et al. "Synchronization Method Based on a New Constant Envelop Preamble for OFDM Systems" IEEE Transactions on Broadcasting, IEEE Service Center, Piscataway, NJ, US, vol. 51, No. 1, Mar. 1, 2005; pp. 139-143; XP011127926, ISSN: 0018-9316.
Ericsson "Comparison of Zadoff-Chu and Zero Correlation Zone Codes for E-Utra RACH" TSG-RAN WG1 #46, R1-062275; Tallinn, Estonia, Aug. 28-Sep. 1, 2006.
Huawei "RACH Design for E-UTRA" 3GPP TSG RAN WG1 Meeting #44, R1-060328, Denver, USA, Feb. 13-17, 2006; XP050101275.
IPWireless "Required RACH Preamble Length" 3GPP TSG RAN WG1 #46bis, Tdoc R1-062914, (Seoul, Korea, Oct. 9-13, 2006.
LGE "RACH Sequence Extension Methods for Large Cell Deployment" 3GPP TSG RAN1 LTE WG1 Meeting #46; R1-062306; Tallinn, Estonia, Aug. 28-Sep. 1, 2006.
LG Electronics "RACH Design for Large Cell Deployment" 3GPP TSG RAN WG1 Meeting #46, R1-062307, Tallinn, Estonia, Aug. 28-Sep. 1, 2006.
LG Electronics "RACH Design Under Frequency Offset" 3GPP TSG RAN WG1 Meeting #47, R1-1063162, Riga, Latvia, Nov. 6-Nov. 10, 2006.
Lucent Technologies "RACH in Support of High-Speed UEs" 3GPP TSG-RAN WG1 #46; R1-062387; Tallinn, Estonia, Aug. 28-Sep. 1, 2006.
Nortel Networks "Consideration on UL RACH Scheme for LTE" 3GPP RAN1, Meeting #44, R1-060653; Denver, USA, Feb. 13-17, 2006.
Panasonic "Random Access Design for E-UTRA uplink" TSG-RAN WG1 Meeting #45; R1-1061114; Shanghai, China May 8-12, 2006; XP050102007.
RAN1 "LS on Random Access Burst Message Size for LTE" 3GPP TSG RAN WG1 Meeting #45; R1-061599; Shanghai, China, May 8-12, 2006.
Samsung "Random Access Message Transmission" 3GPP TSG RAN WG1 Meeting #45; R1-1061317; Shanghai, China, May 8-12, 2006.
Texas Instruments "On Allocation of Uplink Piot Sub-Channels in EUTRA SC-FDMA" 3GPP ITSG-RAN WG1 Meeting Ad Hoc LTE, XX, XX, No. R1-050822, Aug. 29, 2005; XP002448008.
Texas Instruments "RACH Preamble Design for E-UTRA" 3GPP TSG RAN WG1 #44-bis; R1-060866; Athens, Greece, Mar. 27-31, 2006.
Notification of Reason for Refusal (Including Translation) for Korean Application No. 10-2006-0087290, mailed Sep. 18, 2009.
Decision to Grant for Korean Application No. 10-2006-0087290, mailed Dec. 24, 2009.
Notification of Reason for Refusal for Korean Application No. 10-2006-0094103, mailed Mar. 25, 2013.
Decision to Grant for Korean Application No. 10-2006-0094103, mailed Sep. 5, 2013.
International Search Report for International Application No. PCT/KR2007/004359, mailed May 8, 2008.
Written Opinion for International Application No. PCT/KR2007/004359, mailed May 8, 2008.
International Preliminary Report on Patentability for International Application No. PCT/KR2007/004359, mailed Mar. 26, 2009.
European Search Report for European Patent Application No. 07808151.0, mailed Aug. 31, 2012.
Communication Pursuant to Rules 70(2) and 70a(2) EPC for European Patent Application No. 107808151.0, mailed Sep. 18, 2012.
Communication Under Rule 71(3) EPC—Intent to Grant for European Patent Application No. 107808151.0, mailed Nov. 21, 2012.
Notification of Reason for Refusal for Korean Application No. 10-2006-0052167, mailed Jul. 26, 2012.
Decision to Grant for Korean Application No. 10-2006-0052167, mailed Nov. 20, 2012.
Notification of Reason for Refusal for Korean Application No. 10-2006-0057488, mailed Aug 27, 2012.
Decision to Grant for Korean Application No. 10-2006-0057488, mailed Jan. 30, 2013.
International Search Report for International Application No. PCT/KR2007/002784, mailed Apr. 22, 2009.
Written Opinion for International Application No. PCT/KR2007/002784, mailed Apr. 22, 2009.
International Preliminary Report on Patentability for International Application No. PCT/KR2007/002784, mailed May 12, 2009.
Official Action (including translation) for Chinese Patent Application No. 200780021480.8, issued Sep. 16, 2011.
Official Action for Chinese Patent Application No. 200780021480.8, issued Jul. 17, 2012.
Official Action (including translation) for Chinese Patent Application No. 200780021480.8, issued Nov. 14, 2012.
Official Action (including translation) for Chinese Patent Application No. 200780021480.8, issued Mar. 27, 2013.
Decision on Rejection (including translation) for Chinese Patent Application No. 200780021480.8, issued Jul. 3, 2013.
Notification of Reexamination (including translation) for Chinese Patent Application No. 200780021480.8, issued Nov. 17, 2014.
Decision of Reexamination (including translation) for Chinese Patent Application No. 200780021480.8, issued May 14, 2015.
European Search Report for European Patent Application No. 07746855.1, mailed Oct. 12, 2011.
Communication Pursuant to Rules 70(2) and 70a(2) EPC for European Patent Application No. 107746855.1, mailed Oct. 31, 2011.
Office Action for European Patent Application No. 07746855.1, mailed Dec. 13, 2012.
Summons to Attend Oral Proceedings Pursuant to Rule 115(a) EPC for European Patent Application No. 07746855.1, mailed Apr. 24, 2013.
Result of Consultation for European Patent Application No. 07746855.1, mailed Nov. 7, 2013.
Communication Under Rule 71(3) EPC—Intention to Grant for European Patent Application No. 07746855.1, mailed Dec. 18, 2013.
European Search Report for European Patent Application No. 14002630.3, mailed Feb. 2, 2015.
Official Action for Japanese Patent Application No. 2009-514211, mailed Nov. 16, 2011.
Official Action for Japanese Patent Application No. 2009-514211, mailed Mar. 21, 2012.
Official Action for Japanese Patent Application No. 2009-514211, mailed Jun. 27, 2012.
Official Action for Japanese Patent Application No. 2009-514211, mailed Sep. 7, 2012.
Notice of Allowance for Japanese Patent Application No. 2009-514211, mailed Dec. 5, 2012.
Official Action for Taiwan Patent Application No. 96120838, issued Oct. 4, 2013.

(56) References Cited

OTHER PUBLICATIONS

Notice of Allowance (including translation) for Taiwan Patent Application No. 96120838, issued Aug. 26, 2014.
Official Letter for Taiwan Patent Application No. 103133615 issued Aug. 27, 2015.
Notice of Allowance (including Translation) for Korean application No. 10-2006-0092836, issued Feb. 5, 2013.
Notice of Allowance for U.S. Appl. No. 12/440,869, mailed May 19, 2010.
Official Action for U.S. Appl. No. 12/836,391, mailed Sep. 14, 2012.
Notice of Allowance for U.S. Appl. No. 12/836,391, mailed Dec. 12, 2012.
Official Action for U.S. Appl. No. 12/303,947, mailed Sep. 16, 2011.
Notice of Allowance for U.S. Appl. No. 12/303,947, mailed Mar. 6, 2012.
Office Action for U.S. Appl. No. 13/489,408, mailed Nov. 5, 2012.
Office Action for U.S. Appl. No. 13/489,408, mailed Jun. 26, 2013.
Notice of Allowance for U.S. Appl. No. 13/489,408, mailed Aug. 14, 2013.
Office Action for U.S. Appl. No. 14/020,537, mailed Sep. 2, 2014.
Notice of Allowance fo U.S. Appl. No. 14/020,537, mailed Feb. 20, 2015.
Office Action for U.S. Appl. No. 14/700,473, mailed Sep. 21, 2015.
Notice of Allowance for U.S. Appl. No. 14/700,473, mailed Nov. 12, 2015.
Official Action for U.S. Appl. No. 12/376,747, mailed Oct. 18, 2011.
Official Action for U.S. Appl. No. 12/376,747, mailed Feb. 8, 2012.
Notice of Allowance for U.S. Appl. No. 12/376,747, mailed Jun. 13, 2012.
Notice of Allowance for Taiwan Patent Application No. 103133615 issued Jan. 26, 2016.
Documents filed with U.S. District Court Proceedings for *Evolved Wireless, LLC v. APPLE INC.*; U.S. District Court, for the District of Delaware (Wilmington); Civil Action No. 1:15-cv-00542-SLR-SRF; Includes documents filed from Aug. 23, 2016-Nov. 8, 2016 Docket Nos. 77-108; (785 pages).
Documents filed with U.S. District Court Proceedings for *Evolved Wireless, LLC v. HTC Corporation et al.*; U.S. District Court, for the District of Delaware (Wilmington); Civil Action No. 1:15-cv-00543-SLR-SRF; Includes documents filed from Aug. 23, 2016-Nov. 8, 2016; Docket Nos. 82-114; (702 pages).
Documents filed with U.S. District Court Proceedings for *Evolved Wireless, LLC v. Lenovo Group Ltd., et al..*; U.S. District Court, for the District of Delaware (Wilmington); Civil Action No. 1:15-cv-00544-SLR-SRF; Includes documents filed from Aug. 23, 2016-Nov. 8, 2016; Docket Nos. 72-102; (740 pages).
Documents filed with U.S. District Court Proceedings for *Evolved Wireless, LLC v. Samsung Electronics Co. Ltd., et al.*; U.S. District Court, for the District of Delaware (Wilmington); Civil Action No. 1:15-cv-00545-SLR-SRF; includes documents filed from Aug. 23, 2016-Nov. 8, 2016; Docket Nos. 92-126; (775 pages).
Documents filed with U.S. District Court Proceedings for *Evolved Wireless, LLC v. ZTE Corporation*; U.S. District Court, for the District of Delaware (Wilmington); Civil Action No. 1:15-cv-00546-SLR-SRF; Includes documents filed from Aug. 23, 2016-Nov. 8, 2016; Docket Nos. 80-113; (733 pages).
Documents filed with U.S. District Court Proceedings for *Evolved Wireless, LLC v. Microsoft Corporation, et al.*; U.S. District Court, for the District of Delaware (Wilmington); Civil Action No. 1:15-cv-00547-SLR-SRF; Includes documents filed from Aug. 24, 2016-Nov. 8, 2016; Docket Nos. 79-113; (796 pages).
Patent Owner's Preliminary Response for *Apple, Inc. et al. v. Evolved Wireless LLC*, United States Patent and Trademark Office—Before the Patent Trial and Appeal Board, Case No. IPR 2016-01177, filed Sep. 28, 2016 (35 pages).
Patent Owner's Preliminary Response for *Samsung Electronics Co., Ltd., et al. v. Evolved Wireless LLC*, United States Patent and Trademark Office—Befor the Patent Trial and Appeal Board, Case No. IPR 2016-01310, filed Sep. 30, 2016 (39 pages).
Decision—Institution of Inter Partes Review for Inter Partes Review of U.S. Pat. No. 8,218,481 for *Apple, Inc. et al., v. Evolved Wireless, LLC*, United States Patent and Trademark Office—Before the Patent Trial and Appeal Board, Case No. IPR 2016-00981, filed Nov. 3, 2016 (23 pages).
Scheduling Order for Inter Partes Review of U.S. Pat. No. 8,218,481 for *Apple, Inc. et al., v. Evolved Wireless, LLC*, United States Patent and Trademark Office—Before the Patent Trial and Appeal Board, Case No. IPR 2016-00981, filed Nov. 3, 2016 (8 pages).
Decision—Institution of Inter Partes Review for *ZTE (USA),Inc. et al., v. Evolved Wireless, LLC*, United States Patent and Trademark Office—Before the Patent Trial and Appeal Board, Case No. IPR 2016:00758, filed Sep. 16, 2016 (22 pages).
Scheduling Order for *ZTE (USA), Inc. et al., v. Evolved Wireless, LLC*, United States Patent and Trademark Office—Before the Patent Trial and Appeal Board, Case No. IPR 2016-00758, filed Sep. 16, 2016 (8 pages).
Order—Conduct o fhte Proceedings 37 C.F.R. 0 42.5 for *ZTE (USA), Inc. et al., v. Evolved Wireless, LLC*, United States Patent and Trademark Office—Before the Patent Trial and Appeal Board, Case No. IPR 2016-00758, filed Oct. 19, 2016 (3 pages).
Joint Stipulation to Modify the Schedule for *ZTE (USA), Inc. et al., v. Evolved Wireless, LLC*, United States Patent and Trademark Office—Before the Patent Trial and Appeal Board, Case No. IPR 2016-00758, filed Oct. 19, 2016 (3 pages).
Evolved Wireless, LLC's Motion for *Pro Hac Vice* Admission of Andrew D. Hedden Under 37 C.F.R. 0 42.10(C) for *ZTE (USA), Inc. et al., v. Evolved Wireless, LLC*, United States Patent and Trademark Office—Before the Patent Trial and Appeal Board, Case No. IPR 2016-00758, filed Oct. 25, 2016 (8 pages).
Patent Owner's Preliminary Response to Petitioners' Petition for Inter PartesReview of U.S. Pat. No. 8,218,480 for *ZTE (USA), Inc. et al., v. Evolved Wireless, LLC*, United States Patent and Trademark Office—Befor the Patent Trial and Appeal Board, Case No. IPR 2016-01342, filed Oct. 24, 2016 (29 pages).
Patent Owner's Preliminary Response to Petitioners' Petition for Inter Partes Review of U.S. Pat. No. 8,218,481 for *ZTE (USA), Inc. v. Evolved Wireless, LLC*, United States Patent and Trademark Office—Before the Patent Trial and Appeal Board, Case No. IPR 2016-01349, filed Oct. 19, 2016 (50 pages).
Petition for Inter Partes Review of U.S. Pat. No. 8,218,481 including Exhibites 1001-1034, Case No. IPR 2017-00068, filed Oct. 14, 2016 (1,011 pages).
Motion for Joinder Under 35 U.S.C. 0 315(c) and 27 C.F.R. 0 42.122(b), and Request for Shortened Response Time for Patent Owner's Preliminiary Response for *Apple Inc., et al. v. Evovled Wireless, LLC*, United States Patent and Trademark Office—Before the Patent Trial and Appeal Board, Case No. IPR 2017-00068, filed Oct. 14, 2016 (9 pages).
Patent Owner's Mandatory Disclosures for *Apple Inc., et al. v. Evolved Wireless, LLC*, United States Patent and Trademark Office—Before the Patent Trial and Appeal Board, Case No. IPR 2017-00068, filed Oct. 24, 2016 (9 pages).
Notice of Filing Date Accorded to Petition and Time for Filing Paten Owner Preliminary Response for *Apple Inc., et al. v. Evolved Wireless, LLC*, United States Patent and Trademark Office—Before the Patent Trial and Appeal Board, Case No. IPR 2017-00068, filed Oct. 25, 2016 (5 pages).
Petition for Inter Partes Review of U.S. Pat. No. 8,218,481 including Exhibits 1001-1034, Case No. IPR 2017-00106, filed Oct. 18, 2016 (1,485 pages).
Motion for Joinder Under 35 U.S.C. 0 315(c) and 37 C.F.R. 00 42.22 and 42.122(b) to Inter Partes Review of IPR 2016-00758 for *Samsung Electronics Co., Ltd., et al. v. Evolved Wireless, LLC*, United States Patent and Trademark Office—Before the Patent Trial and Appeal Board, Case No. IPR 2017-00106, filed Oct. 18, 2016 (15 pages).
Patent Owner's Mandatory Disclosures for *Samsung Electronics Co., Ltd. v. Evolved Wireless, LLC*, United States Patent and Trademark Office—Before the Patent Trial and Appeal Board, Case No. IPR 2017-00106, filed Oct. 24, 2016 (9 pages).
Notice of Filing Date Accorded to Petition and Time for Filing Patent Owner Preliminary Response for *Samsung Electronics Co.,*

(56) References Cited

OTHER PUBLICATIONS

Ltd., et al. v. Evolved Wireless, LLC, United States Patent and Trademark Office—Before the Patent Trial and Appeal Board, Case No. IPR 2017-00106, filed Oct. 31, 2016 (3 pages).
U.S. Appl. No. 60/759,697, filed Jan. 17, 2006, Tan et al.
U.S. Appl. No. 60/815,246, filed Jun. 19, 2006, Zhang et al.
U.S. Appl. No. 60/815,023, filed Jun. 20, 2006, Chandra et al.
U.S. Appl. No. 60/015,159, filed Dec. 19, 2007, Kitazoe et al.
3GPP Meeting Registration; Meeting: RAN2#62; Kansas City; May 5, 2008 (6 pages).
3GPP Meeting Registration; Meeting: 3GPPRAN1#44; Mar. 10, 2016 (7 pages).
3GPP Meeting Registration; Meeting; 3GPPRAN1#44-bis; Mar. 12, 2016 (6 pages).
3GPP Meeting Registration; Meeting: 3GPPRAN2#62-bis; Mar. 12, 2016 (6 pages).
3GPP TSG RAN WG1 Ad Hoc on LTR "On Allocation of Uplink Pilot Sub-Channels in EUTRA SC-FDMA" London, UK; R1-050822; Aug. 29-Sep. 2, 2005; (7 pages).
3GPP TSG RAN WG1 Ad Hoc on LTE "On Uplink Pilot in EUTRA SC-FDMA" San Diego, USA; R1-051062; Oct. 10-14, 205 (7 pages).
3GPP TSG-RAN WG2 "Access Procedure" Shanghai, China; R2-061201; May 8-12, 206 (3 pages).
3GPP TSG RAN WG1 #42 on LTE "Orthogonal Pilot Channel in the Same Node B in Evolved UTRA Uplink" London, UK; R1-0508521; Aug. 29-Sep. 2, 2005; (9 pages).
3GPP TSG RAN1 #44 "RACH Design for EUTRA" Denver, USA; R1-060387; Feb. 13-17, 2006 (11 pages).
3GPP TSG RAN #44 "RACH Design for EUTRA" Denver, USA; R1-060387; Marked-Up; Feb. 13-17, 2006 (11 pages).
3GPP TSG RAN WG1 #44 "Some Consideration for LTE Rach 13.2.3.1" Denver, USA; R1-060531; Feb. 13-17, 2006 (4 pages).
3GPP TSG WG1 Meeting #44 bis "RACH Design for E-UTRA" R1-060797; Athens, Greece, Mar. 27-31, 2006 (9 pages_.
3GPP TSG RAN1 #44-bis "Random Access Sequence Design" R1-060884; Athens, Greece, Mar. 24-26, 2006 (7 pages).
3GPP TSG-RAN WG3 #48 bis meeting "On Intra-Access Mobility for LTE_Active UEs" Cannes, Frances; R3-051108; Oct. 11-14, 2005 (4 pages).
3GPP TSG-RAN WG2 #50 "Intra-System Mobility" Sophia-Antipolis, France; R2-060013; Jan. 9-13, 2006 (7 pages).
3GPP TSG RAN WG2 #52 "Mobility in LTE Active" Athens, Greece, Tdoc R2-060915; Mar. 27-31, 2006 (4 pages).
3GPP TSG-RAN WG2 Meeting #53 "Cell Switching in LTE_Active State" Shanghai, China; R2-061196; May 8-12, 2006 (5 pages).
3GPP TSG-RAN WG1 Meeting #53 "UL Grant for Random Access Message 3" R1-082078; Kansas City, USA; May 5-9, 2008 (4 pages).
3GPP TSG-RAN WG2 Meeting #53 "Intra-LTE Handover Operation" Shanghai, PRC; R2-061135; May 8-13, 2016 (3 pages).
3GPP TSG-RAN WG3 #53bis "Intral-LTE Mobility Procedure" Seoul, Korea; R3-061489; Oct. 10-13, 2006 (4 pages).
3GPP TSG RAN WG2 #57 "Uplink Synchronization" R2-070781; St. Louis, USA; Feb. 12-16, 2007 (3 pages).
3GPP TSG-RAN WG2 #61bis "Control of HARQ for RACH message 3" R2-081764; Shenzhen, China; Mar. 31-Apr. 4, 2008 (5 pages).
3GPP TSG-RAN WG2 #62 "Update of MAC Random Access Procedure" Tdoc R2-082731; Kansas City, USA; May 5-9, 2008 (7 pages).
3GPP TSG-RAN2 Meeting #62bis "Clarification of DL- and UL-SCH Data Transfer" Warsaw, Poland, R2-083400; Marked-Up; Jun. 30-Jul. 4, 2008 (7 pages).
3GPP TSG-RAN2 Meeting #62bis "Clarification of DL- and UL-SCH Data Transfer" Warsaw, Poland, R2-083701 (revision of R2-083400); Marked-Up; Jun. 30-Jul. 4, 2008 (8 pages).
3GPP TSG-RAN2 Meeting #62bis "NDI and Msg3" Warsaw, Poland, R2-083703; Marked-Up; Jun. 30-Jul. 4, 2008 (3 pages).

3GPP TSG-RAN2 Meeting #63 "Corrections Relating to RACH Partitioning" Jeju, Korea; R2-084788; Aug. 18-22, 2008; (4 pages).
3GPP TSG-RAN WG2 63 "PCCH Configuration in SIB1" Jeju, Korea; R2-083882; Aug. 18-22, 2008; (4 pages).
3GPP TSG-RAN WG2 Meeting #64bis "Clarification on RA Preambles" Athens, Greece; R2-091523; Jan. 9-13, 2009 (3 pages).
3GPP TSG-RAN WG2 Meeting #64bis "Clarification on RA Preambles" Athens, Greece; R2-091523; Marked-Up; Jan. 9-13, 2009 (3 pages).
3GPP TS 25.302 V6.5.0 "3rd Generation Partnership Project; Technical Specification Group Radio Access Network; Services Provided by the Physical Layer (Release 6)" Sep. 2005 (75 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"; Oct. 2005 (17 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"—Marked-Up; Oct. 2005 (18 pages).
3GPP TR 25.814 V0,3.1 "3rd Generation Partnership Project; Technical Specification Group Radio Access Network; Physical Layer Aspects for Evolved UTRA (Release 7)" Oct. 2005 (51 pages).
3GPP TR 25.912 V7.0.0 "3rd Generation Partnership Project; Technical Specification Group Radio Access Network; Feasibility Study for Evolved Universal Terrestrial Radio Access (UTRA) and Universal Terrestrial Radio Access Network (E-UTRAN) (Release 7)" Jun. 2006 (55 pages).
3GPP TS 36.300 V8.5.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" May 2008 (134 pages).
3GPP TS 36.300 V8.7.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2008 (144 pages).
3GPP TS 36.300 V8.8.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2009 (156 pages).
3GPP TS 36.300 V0.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (87 pages).
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (33 pages).
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (32 pages).
3GPP TS 36.321 V8.3.0 "3rd Generation Partnership Project; Technical Specification Group Radio Access Network; Evolved Universal Terrestrial Radio Access (E-UTRA) Medium Access Control (MAC) Protocol Specification (Release 8)" Sep. 2008 (36 pages).
Chu, David C. "Polyphase Codes with Good Periodic Correlation Properties" Information Theory IEEE Transaction on, vol. 18, Issue 4, pp. 531-532, Jul. 1972).
Ericsson "Clarification of DL- and UL-SCH Data Transfer" 3GPP TSG-RAN2 Meeting #62bis; R2-083727I Warsaw, Poland; Jun. 30-Jul. 4, 2008 (7 pages).
ETSI TS 101 475 V1.3.1 "Broadband Radio Access Networks (BRAN); Hiperlan Type 2; Physical (PHY) Layer" Dec. 2001 (43 pages).

(56) References Cited

OTHER PUBLICATIONS

ETSI TS 101 761-1 V1.3.1 "Broadband Radio Access Networks (BRAN); Hiperlan Type 2; Data Link Control (DLC) Layer; Part 1: Basic Data Transport Functions" Dec. 2001 (88 pages).
ETSI TS 136 321 V8.2.0 "LTE; Evolved Universal Terrestrial Radio Access (E-UTRA); Medium Access Control (MAC) Protocol Specification (3GPP TS 36,321 Version 8.2.0 Release 8)" Nov. 2008 (35 pages).
IEEE "Draft IEEE Standard for Local and Metropolitan Area Networks: Part 16: Air Interface for Fixed and Mobile Broadband Wireless Access Systems" IEEE P802.16e/D12, Oct. 14, 2005 (684 Pages).
IEEE "IEEE Standard for Local and Metropolitan Area Networks: Part 16: Air Interface for Fixed and Mobile Broadband Wireless Access Systems; Amendment 2: Physical and Medium Access Control Layers for Combined Fixed and Mobile Operation in Licensed Bands" IEEE P802.16e—2005; Feb. 28, 2006 (864 Pages).
IEEE "IEEE 802.16e Handoff Draft" IEEE C802.16e-03/20rl; Mar. 13, 2003 (22 pages).
IEEE "IEEE 802.16 Standard for Local and Metropolitan Area Networks: Part 16: Air Interface for Fixed Broadband Wireless Access Systems" Oct. 1, 2004 (895 pages).
IEEE "Signaling Methodologies to Support Closed-Loop Transmit Processing in TDD-OFDMA"{IEEE C802.16e-04/103r2; Jul. 7, 2004 (35 pages).
Joint RAN2-RAN3 #48bis LTE "EUTRAN Handover Procedure for LTE_ACTIVE" Cannes, France; TSGR3(05)1106; Oct. 11-14, 2005 (3 pages).
Nuaymi, Loutfi "WiMAX: Technology for Broadband Wireless Access" John Wiley & Sons, Ltd., 2007 (286 pages).
Sesia, Stefania "LTE: The UMTS Long Term Evolution: From Theory to Practice" Second Edition; Wiley; 2011 (794 pages).
TSG-RAN Meeting #41 "REL-8 CRs for LTE to TS 36.321 MAC" Kobe, Japan; RP-080690; Sep. 9-12, 2008; (3 pages).
TSG-RAN Meeting # 43 "RAN2 REL-8 CRs for LTE to TS 36.300" Biarritz, France; RP-090123; Mar. 3-6, 2009 (1 page).
TSG-RAN WG1 Meeting #44 "RACH Preamble Evaluation in E-UTRA Uplink" Denver, USA; R1-060700; Feb. 13-17, 2006 (5 pages).
TSG-RAN WG1 Meeting #44bis "Random Access Burst Evaluation in E-UTRA Uplink" Athens, Greece; R1-060792I Mar. 27-31, 2006 (8 pages).
TSG-RAN WG1 Meeting #45 "Random Access Design for E-UTRA Uplink" Shanghai, China; R1-061114; May 8-12, 2006 (5 pages).
TSG-RAN WG1 Meeting #45 "Random Access Design for E-UTRA Uplink" Shanghai, China; R1-061114; Marked-Up; May 8-12, 2006 (6 pages).
TSG-RAN WG1 #46 "E-UTRA Scalability of Random Access Preamble with Cyclic Prefix." Tallinn, Estonia; R1-062274; Aug. 28-Sep. 1, 2006 (8 pages).
Wu, Yik-Chung et al. "Maximum-Likelihood Symbol Synchronization for IEEE 802.11a WLANs in Unknown Frequency-Selective Fading Channels" IEEE Transactions on Wireless Communications, vol. 4, No. 6, Nov. 2005 (123 pages).
Defendants' Initial Invalidity Contentions; In the United States District Court for the District of Delaware; Civil Action Nos. 1:15-cv-00542-SLR-SRF; 1:15-cv-00543-SLR-SRF; 1:15-cv00544-SLR-SRF; 1:15-cv-00545-SLR-SRF; 1:15-cv-00546-SLR-SRF; 1:15-cv-00547-SLR-SRF;filed Mar. 14, 2016 (1244 pages).
Documents filed with U.S. District Court Proceedings for *Evolved Wireless, LLC* v. *Applie Inc.*; U.S. District Court, for the District of Delaware (Wilmington): Civil Action No. 1:15-cv-00542-SLR-SRF; Includes documents filed from Jun. 25, 2015-May 13, 2016 Docket Nos. 1-53; (1259 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 25, 2015-May 13, 2016 Docket Nos. 1-54; (1369 pages).
Documents filed with U.S. District Court Proceedings for *Evolved Wireless, LLC* v. *Lenovo Group Ltd., et al.*..; U.S. District Court, for the District of Delaware (Wilmington); Civil Action No. 1:15-cv-00544-SLR-SRF; Includes documents filed from Jun. 25, 2015-May 13, 2016;(993 pages).
Documents filed with U.S. District Court Proceedings for *Evolved Wireless, LLC* v. *Samsung Electronics Co. Ltd., et al.*..; U.S. District Court, for the District of Delaware (Wilmington); Civil Action No. 1:15-cv-00545-SLR-SRF; Includes documents filed from Jun. 25, 2015-May 17, 2016 Docket Nos. 1-56; (1202 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 25, 2015-May 17, 2016 Docket Nos. 1-57; (1203 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 25, 2015-May 17, 2016 Docket Nos. 1-57; (1273 pages).
Petition for Inter Partes Review of U.S. Pat. No. 8,218,481, including Exhibits 1001-1034, Case No. IPR2016-00758, filed Mar. 23, 2016 (1,492 pages).
Notice of Filing Date Accorded to Petition and Time for Filing Patent Owner Preliminary Response for *ZTE (USA), Inc. et al.*, v. *Evolved Wireless, LLC*, United States Patent and Trademark Office—Before the Patent Trial and Appeal Board, Case No. IPR 2016-00758, filed Mar. 29, 2016 (5 pages).
Patent Owner's Mandatory Disclosures for *ZTE (USA), Inc. et al.*, v. *Evolved Wireless, LLC*, United States Patent and Trademark Office—Before the Patent Trial and Appeal Board, Case No. IPR 2016-00758, filed Apr. 13, 2016 (4 pages).
Patent Owner's First Supplemental Mandatory Disclosures for *ZTE (USA), Inc. et al.*, v. *Evolved Wireless, LLC*, United States Patent and Trademark Office—Before the Patent Trial and Appeal Board, Case No. IPR 2016-00758, filed May 16, 2016 (4 pages).
Petition for Inter Partes Review of U.S. Patent No. 8,218,481 Pursuant to 35 U.S.C. 00 311-319, 37 C.F.R. 42 , including Exhibits 1001-1025, Case No. IPR2016-00981, filed May 2, 2016 (4,455 pages).
Notice of Filing Date Accorded to Petition and Time for Filing Patent Owner Preliminary Response for *Apple, Inc. et al.*, v. *Evolved Wireless, LLC*, United States Patent and Trademark Office—Before the Patent Trial and Appeal Board, Case No. IPR 2016-00981, filed May 4, 2016 (5 pages).
Corrected Petition for Inter Partes Review of U.S. Pat. No. 8,218,481 Pursuant to 35 U.S.C. 00 311-319, 37 C.F.R. 42 , Case No. IPR2016-00981, filed May 4, 2016 (69 pages).
Notice of Accepting Corrected Petition for *Apple, Inc. et al.*, v. *Evolved Wireless, LLC*, United States Patent and Trademark Office—Before the Patent Trial and Appeal Board, Case No. IPR 2016-00981, filed May 6, 2016 (2 pages).
Patent Owner's Mandatory Disclosures for *Apple, Inc. et al.*, v. *Evolved Wireless, LLC*, United States Patent and Trademark Office—Before the Patent Trial and Appeal Board, Case No. IPR 2016-00981, filed May 16, 2016 (4 pages).
Documents filed with U.S. District Court Proceedings for *Evolved Wireless, LLC* v. *Applie Inc.*; U.S. District Court, for the District of Delaware (Wilmington); Civil Action No. 1:15-cv-00542-SLR-SRF; Includes documents filed from May 17, 2016-Jul. 11, 2016—Docket Nos. 54-67; (4,028 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from May 17, 2016-Jul. 11, 2016—Docket Nos. 55-69; (4,029 pages).
Documents filed with U.S. District Court Proceedings for *Evolved Wireless, LLC* v. *Lenovo Group Ltd.*, et al..; U.S. District Court, for the District of Delaware (Wilmington); Civil Action No. 1:15-cv-00544-SLR-SRf; Includes documents filed from May 17, 2016-Jul. 11, 2016; Docket Nos. 49-61; (4,026 pages).

(56) References Cited

OTHER PUBLICATIONS

Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; includes documents filed from May 26, 2016-Jul. 11, 2016; Docket Nos. 57-77; (4,713 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 1, 2016-Jul. 11, 2016; Docket Nos. 58-70; (4,001 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from May 18, 2016-Jul. 11, 2016—Docket Nos. 58-69; (3.996 pages).
Petition for Inter Pattes Review of U.S. Pat. No, 7,768,965, including Exhibits 1001-1015, Case No. IPR2016-01177, filed Jun. 17, 2016 (679 pages).
Notice of Filing Date Accorded to Petition and Time for Filing Patent Owner Preliminary Response for *Apple, Inc. et al.* v. *Evolved Wireless LLC*, United States Patent and Trademark Office—Before the Patent Trial and Appeal Board, Case No. IPR 2016-01177, filed Jun. 28, 2016 (5 pages).
Patent Owner's Mandatory Disclosures for *Apple, Inc. et al.* v. *Evolved Wireless LLC*, United States Patent and Trademark Office—Before the Patent Trial and Appeal Board, Case No. IPR 2016-01177, filed Jul. 7, 2016 (9 pages).
Petition for Inter Partes Review of U.S. Pat. No. 7,768,965, including Exhibits 1001-1015, Case No. IPR2016-01310, filed Jun. 29, 2016 (681 pages).
Notice of Filing Date Accorded to Petition and Time for Filing Patent Owner Preliminary Response for *Samsung Electronics Co., Ltd., et al.* v. *Evolved Wireless LLC*, United States Patent and Trademark Office—Before the Patent Trial and Appeal Board, Case No. IPR 2016- 01310, filed Jul. 12, 2016 (5 pages).
Patent Owner's Preliminary Response to Petitioners' Petition for Inter Partes Review of U.S. Pat. No. 8,218,481 for *ZTE (USA), Inc. et al.*, v. *Evolved Wireless, LLC*, United States Patent and Trademark Office—Before the Patent Trial and Appeal Board, Case No. IPR 2016-00758, filed Jun. 29, 2016 (24 pages).
Petition for Inter Pattes Review of U.S. Pat. No. 8,218,481 including Exhibits 1001-1042, Case No. IPR2016-01342, filed Jul. 5, 2016 (1,848 pages).
Petition for Inter Partes Review of U.S. Pat. No. 8,218,481 including Exhibits 1001-1028, Case No. IPR2016-01349, filed Jul. 5, 2016 (4,546 pages).
Document filed with U.S. District Court Proceedings for *Evolved Wireless, LLC* v. *Applie Inc.*; U.S. District Court, for the District of Delaware (Wilmington); Civil Action No. 1:15-cv-00542-SLR-SRF; Includes documents filed from Jul. 15, 2016-Aug. 19, 2016—Docket Nos. 68-76; (308 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jul. 15, 2016-Aug. 19, 2016—Docket Nos. 70-81; (336 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jul. 15, 2016-Aug. 19, 2016; Docket Nos. 62-71; (310 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; includes documents filed from Jul. 15, 2016-Aug. 19, 2016; Docket Nos. 78-91; (354 pagesq).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jul. 15, 2016-Aug. 19, 2016; Docket Nos. 71-79; (308 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jul. 15, 2016-Aug. 19, 2016—Docket Nos. 70-78; (305 pages).
Patent Owner's Mandatory Disclosures for *Samsung Electronics Co., Ltd., et al.* v. *Evolved Wireless LLC*, United States Patent and Trademark Office—Before the Patent Trial and Appeal Board, Case No. IPR 2016-01310, filed Jul. 19, 2016 (9 pages).
Patent Owner's Preliminary Response to Petitiioners' Petition for Inter Partes Review of U.S. Pat. No. 8,218,481 for *Apple, Inc. et al.*, v. *Evolved Wireless, LLC*, United States Patent and Trademark Office—Before the Patent Trial and Appeal Board, Case No. IPR 2016-00981, filed Aug. 4, 2016 (50 pages).
Order—Conduct of the Proceedings for *ZTE (USA), Inc. et al.*, v. *Evolved Wireless, LLC*, United States Patent and Trademark Office—Before the Patent Trial and Appeal Board, Case No. IPR 2016-00758, filed Aug. 9, 2016 (4 pages).
Patent Owner's Mandatory Disclosures for *ZTE (USA), Inc. et al.*, v. *Evolved Wireless, LLC*, United States Patent and Trademark Office—Before the Patent Trial and Appeal Board, Case No. IPR 2016-01342, filed Jul. 22, 2016 (9 pages).
Notice of Filing Date Accorded to Petition and Time for Filing Patent Owner Preliminary Response for *ZTE (USA), Inc. et al.*, v. *Evolved Wireless, LLC*, United States Patent and Trademark Office—Before the Patent Trial and Appeal Board, Case No. IPR 2016-01342, filed Aug. 9, 2016 (5 pages).
Patent Owner's Mandatory Disclosures for *ZTE (USA), Inc.* v. *Evolved Wireless, LLC*, United States Patent and Trademark Office—Before the Patent Trial and Appeal Board, Case No. IPR 2016-01349, filed Jul. 22, 2016 (9 pages).
Notice of Filing Date Accorded to Petition and Time for Filing Patent Owner Preliminary Response for *ZTE (USA), Inc.* v. *Evolved Wireless, LLC*, United States Patent and Trademark Office—Before the Patent Trial and Appeal Board, Case No. IPR 2016-01349, filed Aug. 11, 2016 (4 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Nov. 9, 2016-Dec. 12, 2016; (212 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Nov. 9, 2016-Dec 7, 2016; (212 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Nov. 9, 2016-Dec. 7, 2016; (212 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Nov. 9, 2016-Dec. 7, 2016; (220 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Nov. 9, 2016-Dec. 7, 2016; (212 pages).
Documents filed with U.S. District Court Proceedings for *Evolved Wireless, LLC* v. *Microsoft Corporation, et al.*; U.S. District Court, for the District of Delaware (Wilmington); Civil Action No, 1:15-cv-00547-SLR-SRF; Includes documents filed from Nov. 9, 2016-Dec. 14, 2016; (129 pages).
Order: Conduct of the Proceeding 37 C.F.R. § 42.5 for Inter Partes Review of U.S. Pat. No. 8,218,481 for *Apple, Inc. et al.*, v. *Evolved Wireless, LLC*, United States Patent and Trademark Office—Before the Patent Trial and Appeal Board, Case No. IPR 2016-00981, filed Dec. 7, 2016, (4 pages).

(56) References Cited

OTHER PUBLICATIONS

Decision: Granting Motion for Pro Hac Vice Admission 37 C.F.R. § 42.10 for *ZTE (USA), Inc. et al.,* v. *Evolved Wireless, LLC*, United States Patent and Trademark Office—Before the Patent Trial and Appeal Board, Case No. IPR 2016-00758, filed Nov. 4, 2016 (3 pages).
Patent Owner's Notice of Deposition of Dr. Paul S. Min Under 37 C.F.R. §42.53 for *ZTE (USA), Inc. et al.,* v. *Evolved Wireless, LLC*, United States Patent and Trademark Office—Before the Patent Trial and Appeal Board, Case No. IPR 2016-00758, filed Dec. 8, 2016 (3 pages).
Motion for Joinder Under 35 U.S.C. § 315(c) and/or Consolidation Under § 315(d) with Case No. IPR2016-00981 for *ZTE (USA), Inc.*v. *Evolved Wireless, LLC*, United States Patent and Trademark Office—Before the Patent Trial and Appeal Board, Case No. IPR 2016-01349, filed Dec. 5, 2016 (12 pages).
Patent Owner's Opposition to Petitioner's Motion for Joinder, and to Petitioner's Request for Shortened Response Time for Patent Owner's Preliminary Response for *Apple Inc., et al.* v. *Evolved Wireless, LLC*, United States Patent and Trademark Office—Before the Patent Trial and Appeal Board, Case No. IPR 2017-00068, filed Nov. 14, 2016 (15 pages).
Reply to Patent Owner's Opposition to Motion for Joinder for *Apple Inc., et al.* v. *Evolved Wireless, LLC*, United States Patent and Trademark Office—Before the Patent Trial and Appeal Board, Case No. IPR 2017-00068, filed Dec, 13, 2016 (4 pages).
Patent Owner's Opposition to Petitioner's Motion for Joinder for *Samsung Electronics Co., Ltd., et al.* v. *Evolved Wireless, LLC*, United States Patent and Trademark Office—Before the Patent Trial and Appeal Board, Case No. IPR 2017-00106, filed Nov. 14, 2016 (14 pages).
Petitioner's Power of Attorney for *Samsung Electronics Co., Ltd., et al.* v. *Evolved Wireless, LLC*, United States Patent and Trademark Office—Before the Patent Trial and Appeal Board, Case No. IPR 2017-00106, filed Dec. 12, 2016 (2 pages).
Petitioner's Unopposed Motion for Pro Hac Vice Admission of Charles M. Stiernberg Under 37 C.F.R. § 42.10(c) (Including Exhibit 1035) for *Samsung Electronics Co., Ltd. et al.* v. *Evolved Wireless, LLC*, United States Patent and Trademark Office—Before the Patent Trial and Appeal Board, Case No. IPR 2017-00106, filed Dec. 12, 2016 (7 pages).

\* cited by examiner

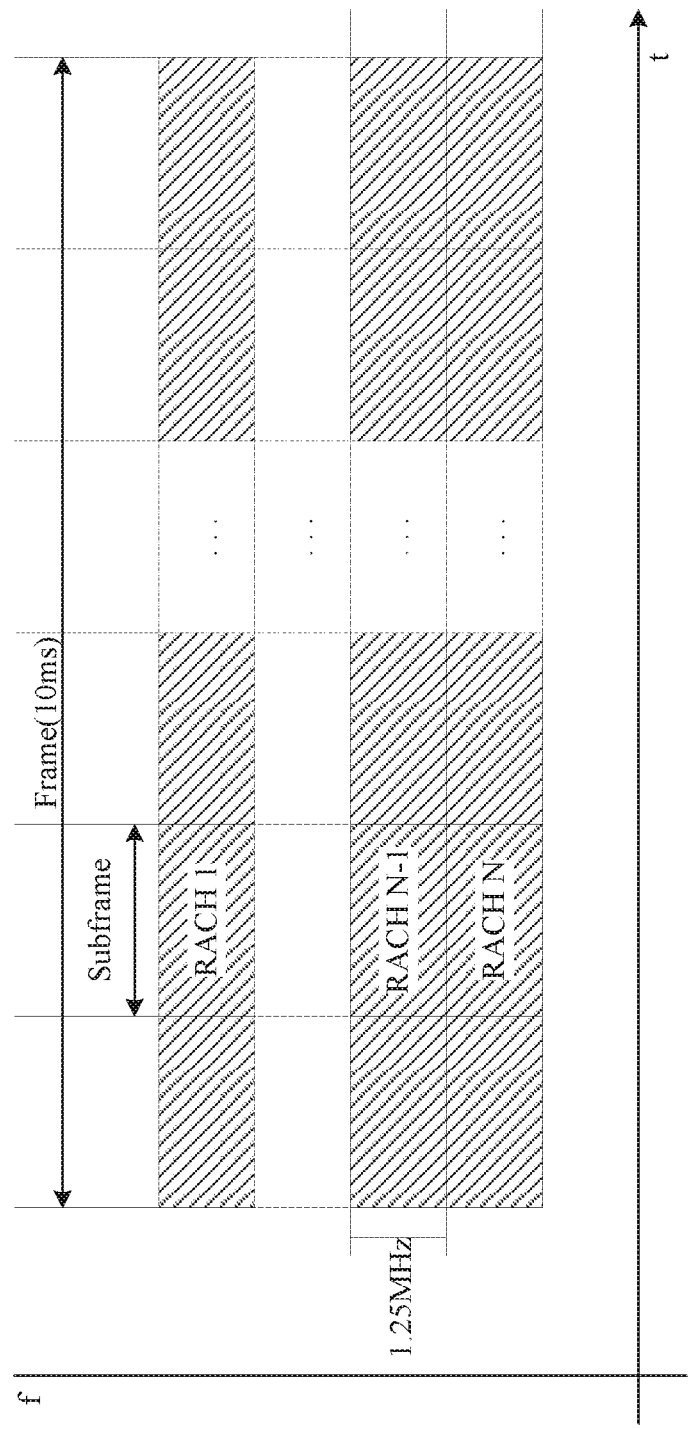

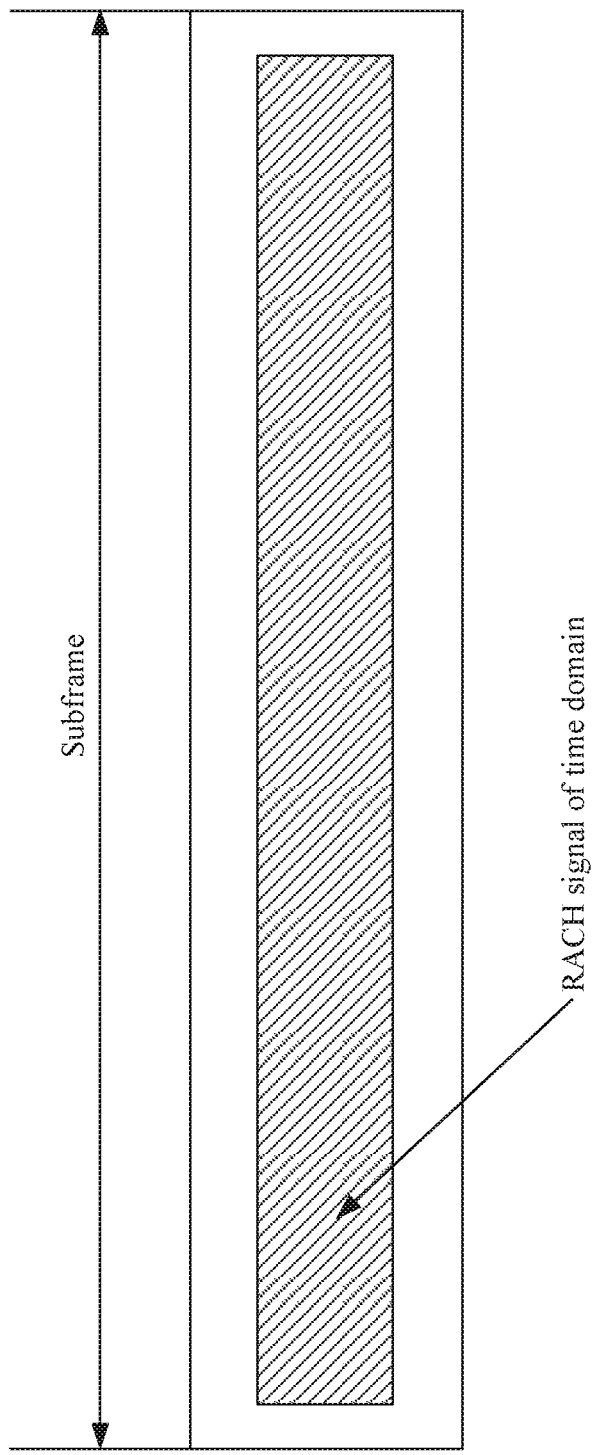

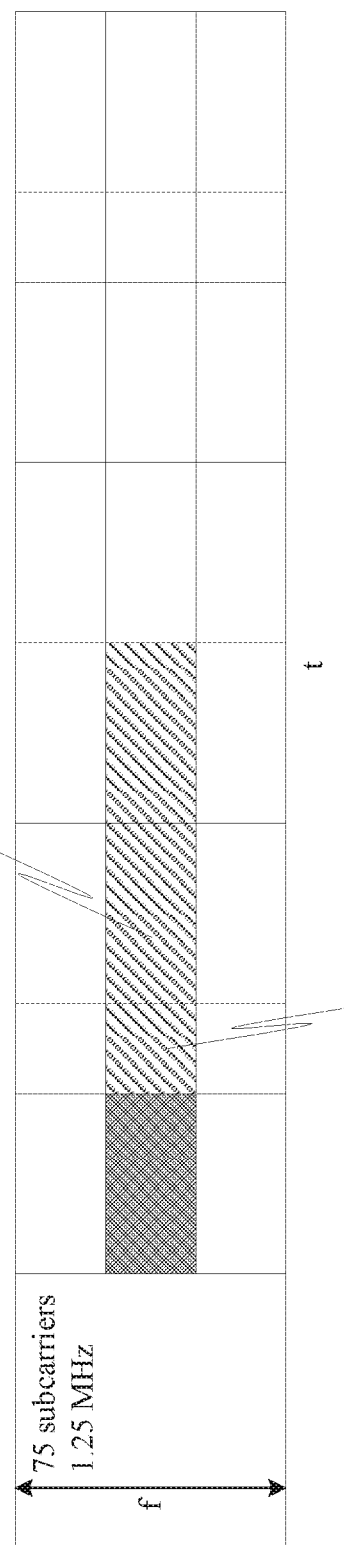

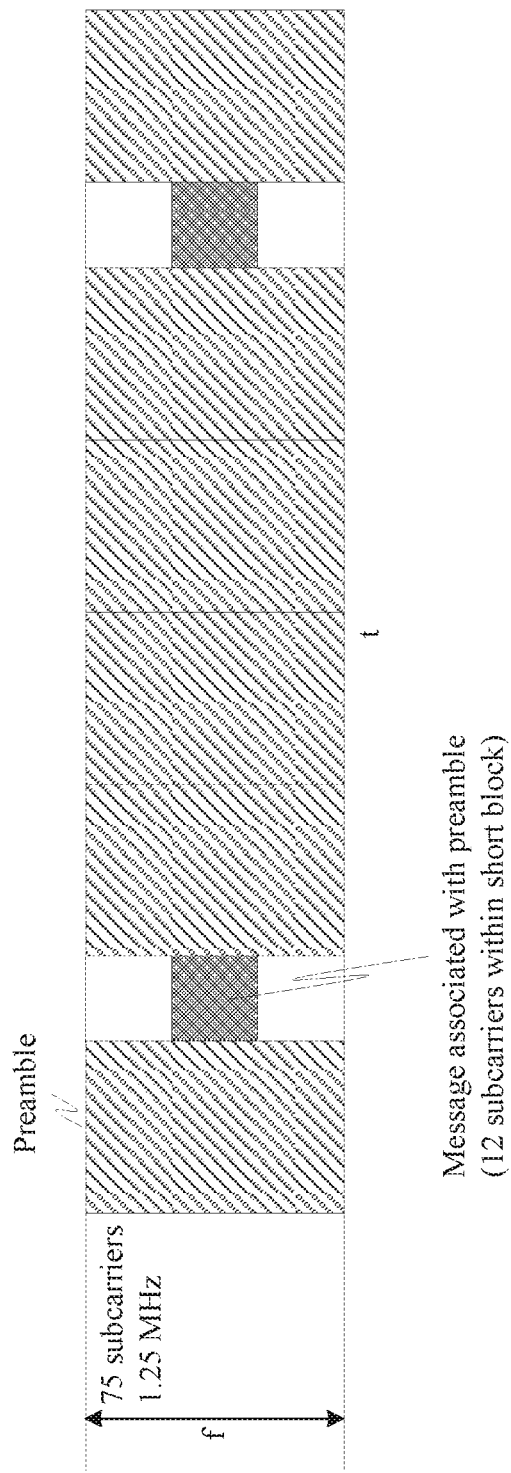

Periodic prefix | Repetitive sequence | Repetitive sequence

Single CAZAC sequence

☐ General CAZAC sequence of 0    ▨ Conjugate CAZAC sequence of 1

FIG. 16
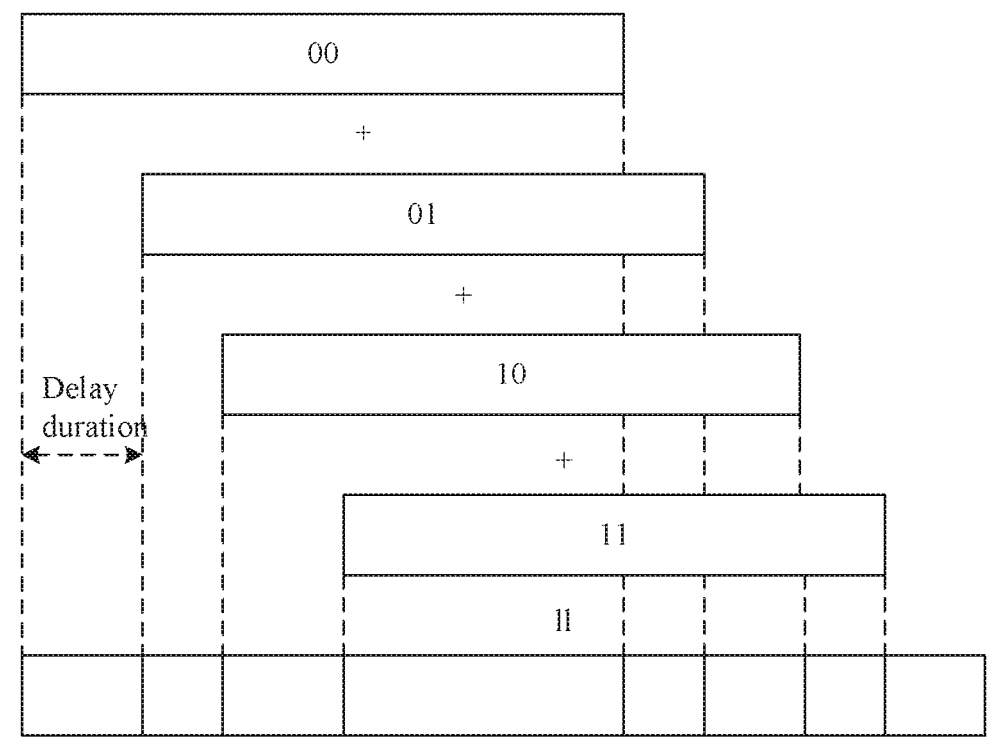

METHOD OF TRANSMITTING DATA IN A MOBILE COMMUNICATION SYSTEM

This application is a Continuation of U.S. patent application Ser. No. 14/700,473, filed Apr. 30, 2015, now U.S. Pat. No. 9,241,349, which is a Continuation of U.S. patent application Ser. No. 14/020,537, filed Sep. 6, 2013, now U.S. Pat. No. 9,037,736, which is a Continuation of U.S. patent application Ser. No. 13/489,408, filed Jun. 5, 2012, now U.S. Pat. No. 8,683,058, which is a Continuation of U.S. patent application Ser. No. 12/303,947, filed Jul. 7, 2010, now U.S. Pat. No. 8,218,481, which is a national stage application under 35 U.S.C. 371 of PCT Application No. PCT/KR2007/002784 having an international filing date of Jun. 8, 2007, which designated the United States, which PCT application claims the benefit of and priority to Korean Patent Application Nos. 10-2006-0057488, filed Jun. 26, 2006, and 10-2006-0052167, filed Jun. 9, 2006, each of which are incorporated herein by reference in their entirety.

TECHNICAL FIELD

The present invention relates to a mobile communication system, and more particularly, to a method of expanding a code sequence, a structure of a random access channel and a method of transmitting data in a mobile communication system.

BACKGROUND ART

A user equipment uses a random access channel (RACH) to access a network in a state that the user equipment is not uplink synchronized with a base station. A signal having repetitive characteristic in a time domain is used in the random access channel, so that a receiver easily searches a start position of a transmission signal. In general, the repetitive characteristic is realized by repetitive transmission of a preamble.

A representative example of a sequence for realizing the preamble includes a CAZAC (Constant Amplitude Zero Auto Correlation) sequence. The CAZAC sequence is expressed by a Dirac-Delta function in case of auto-correlation and has a constant value in case of cross-correlation. In this respect, it has been estimated that the CAZAC sequence has excellent transmission characteristics. However, the CAZAC sequence has limitation in that maximum N−1 number of sequences can be used for a sequence having a length of N. For this reason, a method for increasing available bits of the sequence while maintaining the excellent transmission characteristics is required.

Meanwhile, there are provided various methods for transmitting data from a random access channel by using the CAZAC sequence. Of them, the first method is to directly interpret CAZAC sequence ID to message information. Assuming that data to be transmitted is a preamble, if a sufficient number of sequences that can be used as the preamble are provided, message passing can be performed with only CAZAC sequence ID without additional manipulation. However, since a method of transmitting additional information should be considered in an actual synchronized RACH, problems occur in that there is difficulty in realizing a sufficient number of CAZAC sequence sets, and the cost required for search of a receiver increases.

The second method is to simultaneously transmit CAZAC sequence and Walsh sequence by using a code division multiplexing (CUM) mode. In this case, CAZAC sequence ID is used as user equipment identification information, and the Walsh sequence transmitted in the CDM mode is interpreted as message information. FIG. 1 is a block schematic view illustrating a transmitter for realizing the second method. However, the second method has limitation in that even though the Walsh sequence is added to the CAZAC sequence, bits of message that can additionally be obtained are only $\log_2 N$ bits when the Walsh sequence has a length of N.

The third method is to transmit CAZAC sequence and Walsh sequence in such a way to mix the Walsh sequence with the CAZAC sequence. In this case, CAZAC sequence ID is used as user equipment identification information, and the Walsh sequence is interpreted as message information. FIG. 2 is a block diagram illustrating a data processing procedure at a transmitter for realizing the third method. However, according to the third method, since the Walsh sequence acts as noise in detection of the CAZAC sequence to cause difficulty in detecting sequence ID, there is limitation in that repetitive sequences should be transmitted to prevent the Walsh sequence from acting as noise in detection of the CAZAC sequence.

The fourth method is to either give orthogonality between blocks constituting a corresponding sequence by multiplying an exponential term by a CAZAC sequence or directly apply data modulation such as DPSK, DQPSK, D8PSK, etc. In this case, CAZAC sequence ID is used as user equipment identification information, and the modulated sequence is demodulated and then used as message information. FIG. 3A illustrates data modulation according to the former method of the fourth method, and FIG. 3B illustrates data modulation according to the latter method of the fourth.

Furthermore, the fifth method is to transmit CAZAC sequence by attaching a message part to the CAZAC sequence. FIG. 4A illustrates the case where a message (coded bit) is attached to the CAZAC sequence used as a preamble, and FIG. 4B illustrates the case where a message (coded bit) is attached to a sequence consisting of a predetermined number of blocks to which orthogonality is given.

However, the fourth method and the fifth method have a problem that they are susceptible to change of channel condition.

DISCLOSURE OF THE INVENTION

Accordingly, the present invention has been suggested to substantially obviate one or more problems due to limitations and disadvantages of the related art, and an object of the present invention is to provide a method of transmitting and receiving message between a user equipment and a base station by using a long sequence to maximize time/frequency diversity and alleviating performance attenuation due to channel.

Another object of the present invention is to provide a method of transmitting data through a code sequence in a mobile communication system, in which the quantity of data can be increased and the transmitted data becomes robust to noise or channel change.

Still another object of the present invention is to provide a method of suggesting a structure of an efficient random access channel in a multi-carrier system.

Further still another object of the present invention is to provide a method of minimizing access time of a user equipment to a random access channel in a mobile communication system.

To achieve these objects and other advantages and in accordance with the purpose of the invention, as embodied and broadly described herein, a data transmission method through a random access channel in a mobile communication system comprises generating a new code by multiplying a code sequence by an exponential sequence, and transmitting the new code sequence to a receiving side.

In another aspect of the present invention, a data transmission method by using a code sequence in a mobile communication system comprises conjugating at least one element included in at least one block of a code sequence divided by at least two blocks to indicate predetermined information, and transmitting the code sequence, in which the at least one block is conjugated, to a receiving side.

In still another aspect of the present invention, a data transmission method by using a code sequence in a mobile communication system generating a second code sequence indicating predetermined information by combining at least two first code sequences mapped with at least one information bit, respectively, and transmitting the second code sequence to a receiving side.

In further still another aspect of the present invention, a code sequence transmission method in a mobile communication system comprises generating a combination code sequence by combining a base code sequence to at least one code sequence obtained by circular shift of the base code sequence, and transmitting the combination code sequence to a receiving side.

In further still another aspect of the present invention, a code sequence transmission method in a mobile communication system generating a repetitive code sequence by repeatedly concatenating a first code sequence at least one or more times, generating a cyclic prefix (CP) by copying a certain part of a rear end of the repetitive code sequence and concatenating the copied part to a front end of the repetitive code sequence, and transmitting the repetitive code sequence, in which the CP is generated, to a receiving side.

In further still another aspect of the present invention, a method of allocating a random access channel (RACH) in a multi-carrier system comprises allocating a random access channel to each of at least two consecutive frames in a way that frequency bands of the random access channels allocated to the at least two consecutive frames are not overlapped with each other, and transmitting allocation information of the random access channels allocated to the at least two consecutive frames to at least one user equipment.

In further still another aspect of the present invention, a data transmission method through a code sequence in a mobile communication system mapping each of a plurality of blocks having at least one bit of a input data stream, respectively to a corresponding signature sequence, multiplying a signature sequence stream, to which the plurality of blocks are mapped, by a specific code sequence, and transmitting the signature sequence stream multiplied by the specific code sequence to a receiving side.

BRIEF DESCRIPTION OF THE DRAWINGS

FIG. 5 illustrates an example of a structure of a random access channel used in an OFDMA system;

FIG. 6A and FIG. 6B illustrate examples of sending an RACH signal in a time domain or a frequency domain based on a structure of a random access channel of FIG. 5;

FIG. 8A and FIG. 8B illustrate still another example of a structure of a random access channel used in an OFDMA system;

FIG. 16 is a structural view of unit data to illustrate one embodiment of the present invention, which transmits data by using a code sequence expanded through grouping and delay processing;

BEST MODE FOR CARRYING OUT THE INVENTION

Figure 1:
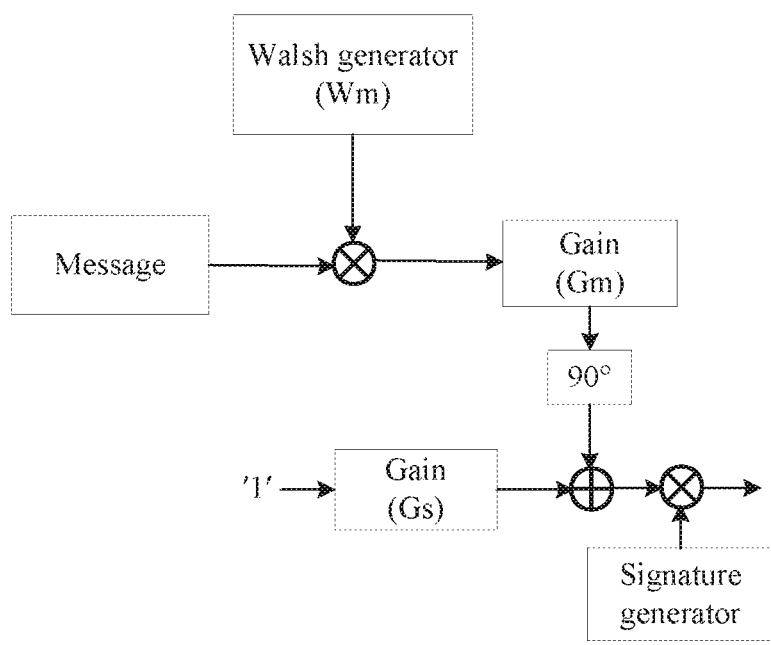
FIG. 1 illustrates an example of a data transmission method through a random access channel in an OFDMA system according to the related art.
Figure 2:
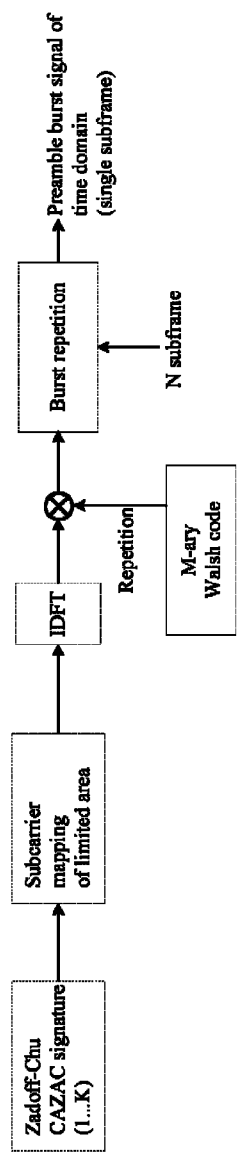
FIG. 2 illustrates another example of a data transmission method through a random access channel in an OFDMA system according to the related art.
Figure 3A:
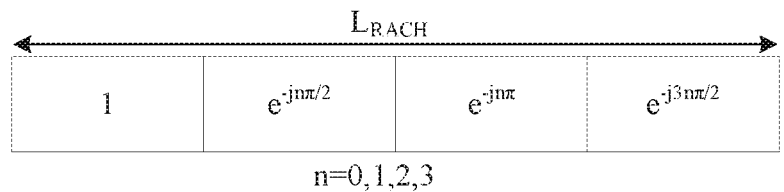
FIG. 3A and FIG. 3B illustrate still another example of a data transmission method through a random access channel in an OFDMA system according to the related art.
Figure 3B:
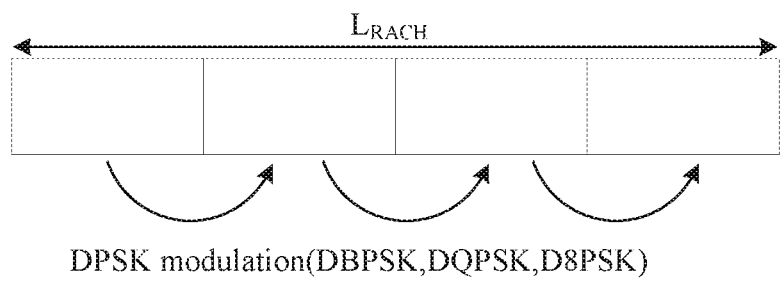
Figure 4A:
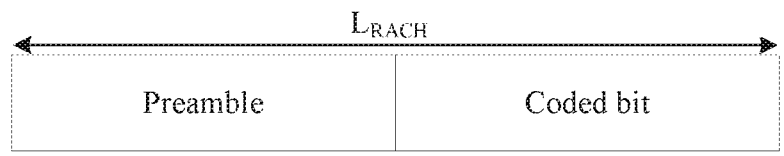
FIG. 4A and FIG. 4B illustrate further still another example of a data transmission method through a random access channel in an OFDMA system according to the related art.
Figure 4B:
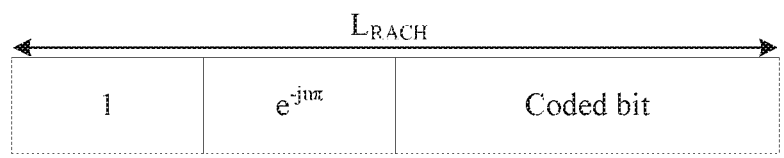

Hereinafter, structures, operations, and other features of the present invention will be understood readily by the preferred embodiments of the present invention, examples of which are illustrated in the accompanying drawings.

A random access channel (RACH) is used to allow a user equipment to access a network in a state that the user equipment is not uplink synchronized with a base station. A random access mode can be classified into an initial ranging access mode and a periodic ranging access mode depending on an access mode to network. According to the initial ranging access mode, the user equipment acquires downlink synchronization and first accesses a base station. According to the periodic ranging access mode, the user equipment connected with a network accesses the network if necessary. The initial ranging access mode is used to allow the user equipment to synchronize with the network while accessing the network and receive its required ID from the network. The periodic ranging access mode is used to initiate a protocol to receive data from the base station or when a packet to be transmitted exists.

In particular, the periodic ranging access mode can be classified into two types in the 3GPP LTE (long term evolution) system, i.e., a synchronized access mode and a non-synchronized access mode. The synchronized access mode is used if an uplink signal is within a synchronization limit when the user equipment accesses the RACH. The non-synchronized access mode is used if the uplink signal is beyond the synchronization limit. The non-synchronized access mode is used when the user first accesses the base station or synchronization update is not performed after synchronization is performed. At this time, the synchronized access mode is the same as the periodic ranging access mode, and is used when the user equipment accesses the RACH for the purpose of notifying the base station of the change status of the user equipment and requesting resource allocation.

On the other hand, the synchronized access mode alleviates limitation of a guard time in the RACH by assuming that the user equipment does not depart from uplink synchronization with the base station. For this reason, much more time-frequency resources can be used. For example, a considerable amount of messages (more than 24 bits) may be added to a preamble sequence for random access in the synchronized access mode so that both the preamble sequence and the messages may be transmitted together.

A structure of the RACH, which performs a unique function of the RACH while satisfying the aforementioned synchronized and non-synchronized access modes will now be described.

FIG. 5 is a diagram illustrating an example of a structure of a random access channel (RACH) used in an OFDMA system. As shown in FIG. 5, it is noted that the RACH is divided into N number of sub-frames on a time axis and M number of frequency bands on a frequency axis depending on a radius of a cell. Frequency in generation of the RACH is determined depending on QoS (Quality of Service) requirements in a medium access control (MAC) layer. In general, the RACH is generated per certain period (several tens of milli-seconds (ms) to several hundreds of ms). In this case, frequency diversity effect and time diversity effect are provided in generating several RACHs and at the same time collision between user equipments which access through the RACH is reduced. The length of the sub-frame can be 0.5 ms, 1 ms, etc.

Figure 6B:
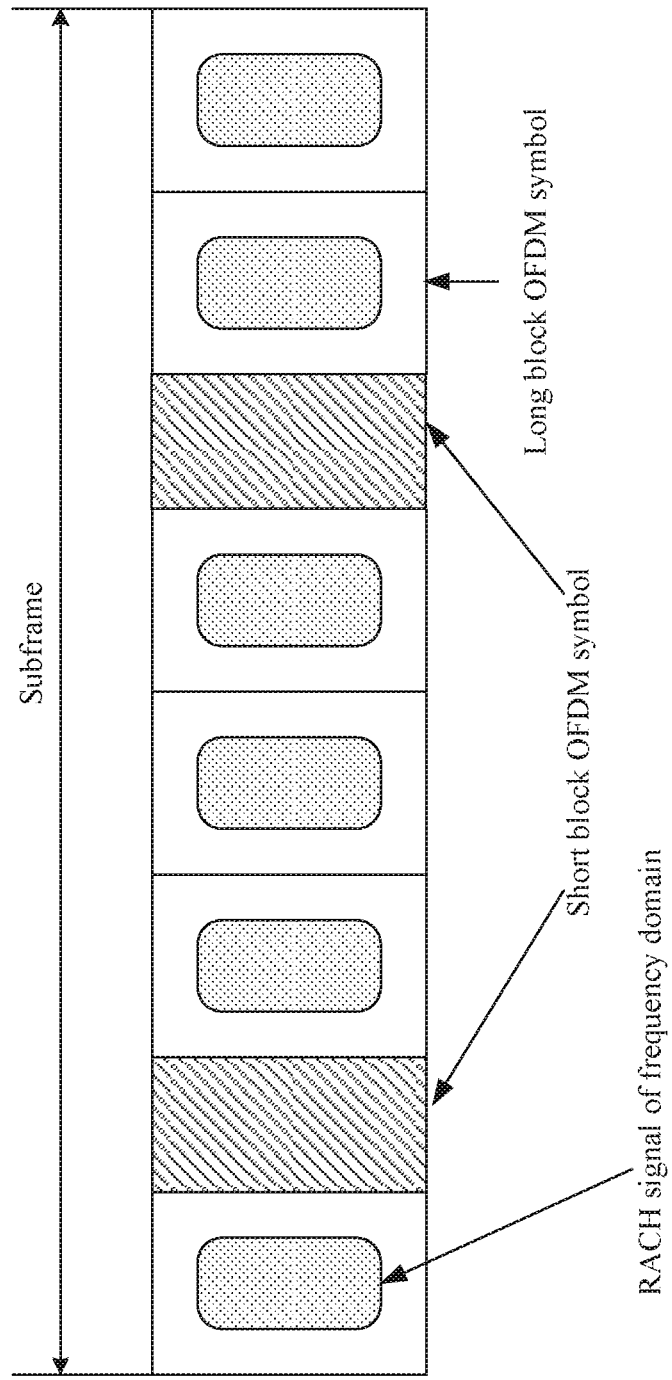

In the RACH structure as shown in FIG. 5, a random sub-frame will be referred to as a time-frequency resource (TFR) which is a basic unit of data transmission. FIG. 6A is a diagram illustrating a type of sending a random access signal to the TFR in a time domain, and FIG. 6B illustrates a type of sending a RACH signal in a frequency domain.

As shown in FIG. 6A, if a random access signal is generated in a time domain, the original sub-frame structure is disregarded and the signal is aligned through only the TFR. By contrast, as shown in FIG. 6B, in case of the synchronized random access mode, the sub-frame structure is maintained in the frequency domain and at the same time a random access signal to be transmitted to sub-carriers of each OFDM symbol is generated. Accordingly, orthogonality can be maintained between respective blocks constituting TFR, and channel estimation can easily be performed.

Figure 7:
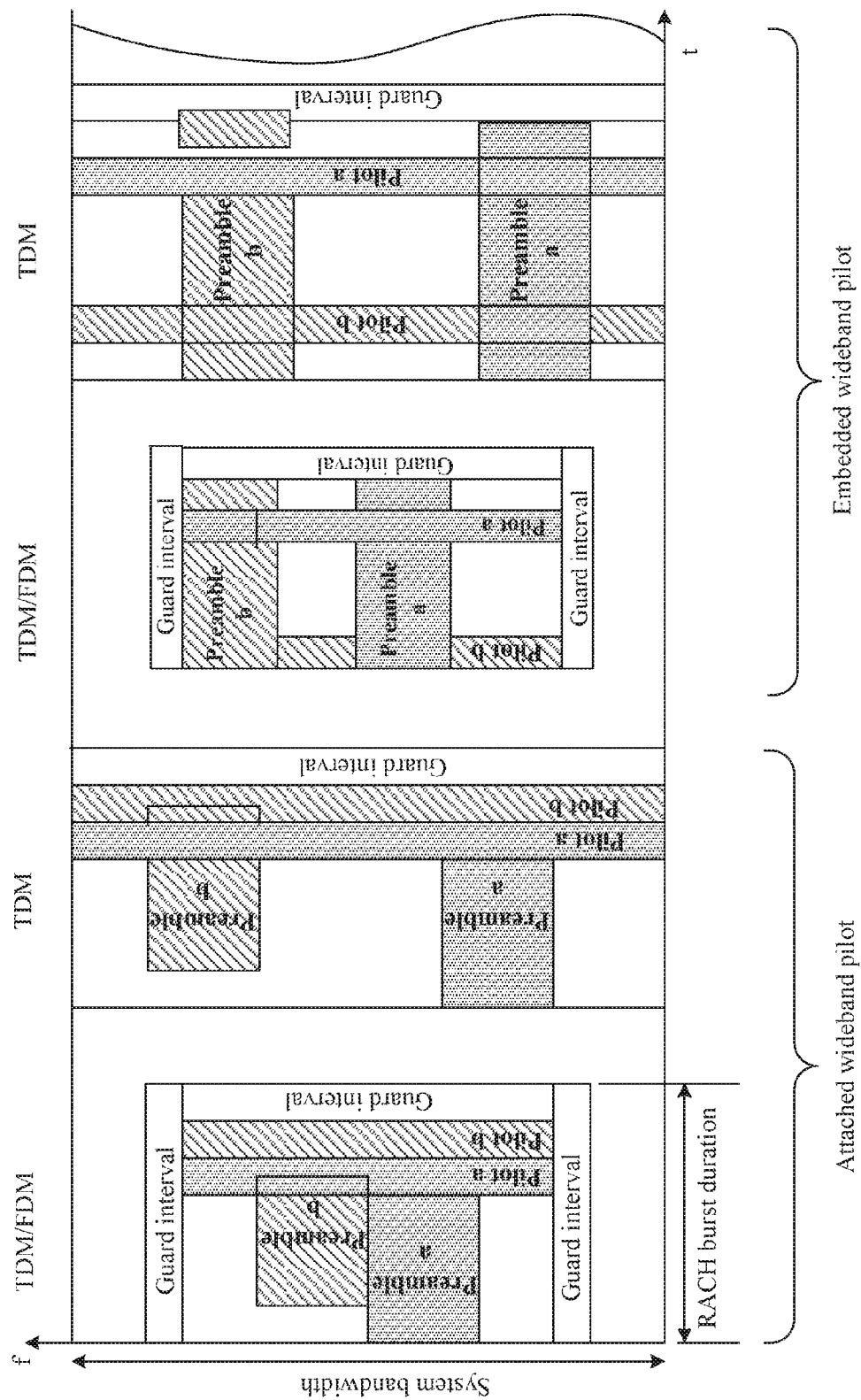
FIG. 7 illustrates another example of a structure of a random access channel used in an OFDMA system.

FIG. 7 is a diagram illustrating another example of a structure of RACH used in an OFDMA system. As shown in FIG. 7, it is noted that a preamble 'b' and a pilot 'a' are partially overlapped in a TDM/FDM mode and a TDM triode of RACH burst duration of an attached wideband pilot, it is also noted that a pilot 'a' and a pilot 'b' are simultaneously overlapped with a preamble 'a' and the preamble 'b' in the TDM/TDM mode and the TDM mode of an embedded wideband pilot. In other words, it is designed that a preamble and a pilot are together transmitted through the RACH, so that message decoding is easily performed through channel estimation if message is added to the RACH. Alternatively, a wideband pilot is used so that channel quality information (CQI) of a total of RACH bands can be acquired in addition to a preamble band of the RACH.

FIG. 8A and FIG. 8B are diagrams illustrating another examples of a structure of the RACH used in the OFDMA system.

As shown in FIG. 8A, a preamble is transmitted for a predetermined time period through a frequency band, and a short block duration is provided at a certain period so that a pilot for decoding a preamble is transmitted to a corresponding short block. At this time, the pilot transmission is performed through a part of a total of frequency bands (transmission through 25 sub-carriers corresponding to a middle band of a total of 75 sub-carriers), so that the pilot can be transmitted to a specific user equipment under a multi-access environment.

Furthermore, as shown in FIG. 8B, a message to be transmitted and a pilot for decoding the message are multiplexed and continue to be transmitted through some frequency hands (for example, 25 middle sub-carrier bands of a total of 75 sub-carrier bands) selected from a total of frequency bands. Accordingly, respective user equipments which perform multi-access can be identified by allocating some frequency bands at different frequencies.

Figure 9:
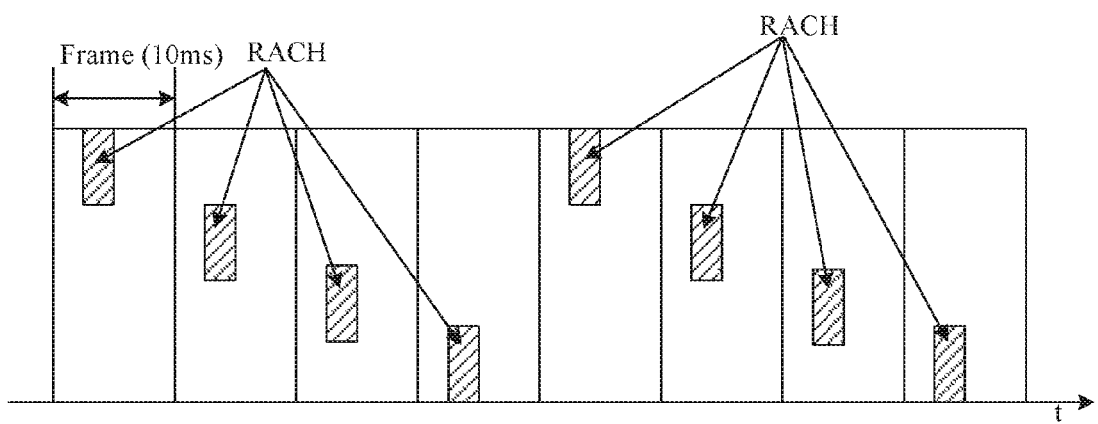
FIG. 9 illustrates a structure of a random access channel according to one embodiment of the present invention.

FIG. 9 is a diagram illustrating a structure of RACH according to one embodiment of the present invention.

Generally, frequency in generation of the RACH is determined depending on QoS requirements in a MAC layer. The RACH is generated at a variable period (several ms to several hundreds of ms) depending on requirements of a cell. The RACH can be generated in a time domain or a frequency domain as described above with reference to FIG. 6A and FIG. 6B. In the embodiment of FIG. 9, the structure of the RACH corresponds to the case where a random access signal is generated in the frequency domain.

Referring to FIG. 9, in this embodiment, to overcome a drawback of a long interval required for retry when the user equipment fails to access the RACH, a corresponding RACH resource is dispersed in each frame within one period if frequency in generation of the RACH and the quantity of overhead are determined. The number of frames included in one period can freely be determined as occasion demands. At this time, it is preferable that the RACH is divisionally arranged so as to be uniformly distributed for each frequency band with respect to a plurality of frames constituting one period. However, position on the time axis may be changed without change of position on the frequency axis and vice versa depending on specific requirements (synchronized action or decrease of inter-cell interference) of a cell or if a system band is small. Also, arrangement of any one of frequency and time may be changed to obtain the minimum interval between the RACHs arranged in each frame.

In the embodiment of FIG. 9, the network should notify the user equipment of position information of the allocated RACH resource. In other words, the network can notify each user equipment of frequency and time information occupied by the RACH resource allocated for each frame included in one period, and each user equipment can try random access through the allocated RACH resource by using the position information from the network. The position information of the RACH resource of each frame can be expressed by sub-carrier offset, the number of sub-carriers, timing offset, and the number of symbols. However, if the RACH information on each frame is expressed by the above four parameters, it may be undesirable in that the quantity of the information can be increased. Accordingly, a method of decreasing the quantity of the information for expressing the position information of the RACH allocated on each frame is required. The position information of the RACH can be transmitted through a broadcast channel (BCH) or other downlink control channel.

As one method, a method using a hopping pattern may be considered. The hopping pattern means a pattern consisting of information indicating frequency domains of the RACH resource allocated to each frame within one period. In other words, in the embodiment of FIG. 9, since the RACH resource is divisionally arranged so as to be uniformly distributed for each frequency band with respect to a plurality of frames constituting one period, an indicator which indicates a frequency band that can be allocated to each frame as the RACH resource is previously determined, and the frequency band of the RACH resource allocated to each frame within one period can be notified through a pattern of the indicator which indicates a corresponding frequency band.

For example, if four frames are used as one period in a system which uses a total of bands of 10 MHz, the position of the RACH includes sub-bands having an interval of 2.5 MHz as one RACH frequency band (band smaller than 1.25 MHz or 2.5 MHz). At this time, a total of bands consist of four sub-bands, wherein the respective sub-bands are designated by indicators, which indicate each sub-band, as 1, 2, 3 and 4 in due order from a high frequency band to a low frequency band. In this way, the frequency band position information of the RACH resource allocated to all frames within one period can be expressed by patterns configured by the above indicators, for example 2, 3, 1, 4. The hopping pattern may be configured differently or equally depending on each frame. Time information of the RACH resource allocated to each frame within one period can generally be expressed by timing offset and the number of symbols. At this time, at least any one of the timing offset and the number of symbols may be fixed to decrease the quantity of the information. For example, if it is previously scheduled that the timing offset and the number of symbols for the RACH resource of each frame are fixed, the network only needs to transmit the hopping pattern to notify the user equipment of the position information of the RACH resource of all frames within one period.

If each sub-band is narrow or considering influence of interference between user equipments, hopping patterns for all frames may be set equally. In this case, the network only needs to notify the user equipment of a frame period.

Hereinafter, the procedure of transmitting uplink data from the user equipment to the base station by using the structure of the RACH as shown in the embodiment of FIG. 9 will be described. In this case, data transmission is performed through the RACH among reverse common channels consisting of a plurality of frames.

First of all, the user equipment tries to access the dispersed RACH included in the current frame to transfer its information to the base station. If the user equipment successfully accesses the RACH, the user equipment transmits preamble data through the corresponding RACH. However, if the user equipment fails to access the RACH, the user equipment tries to access the RACH divisionally arranged in the frame of the next order. At this time, the RACH included in the frame of the next order is preferably arranged in a frequency band different from that of the RACH of the previous frame if the frequency band is not sufficiently wide or there are no specific requirements (inter-cell interference or limitation in action range of user equipment). Also, the above access procedure continues to be performed in the frame of the next order until the user equipment successfully accesses the RACH.

Meanwhile, in case of the synchronized RACH, the sub-frame of each frame preferably includes a short block to which a pilot for the user equipment which has accessed the corresponding RACH is allocated. At least one RACH pilot and access pilot may be allocated to the short block at a predetermined pattern. In other words, the user equipment which has accessed the RACH should know channel information to receive a channel from the base station. The channel information may be set in RACH pilot within an uplink short block. The base station allocates a proper channel to the user equipment through the corresponding RACH pilot. Meanwhile, if the user equipment which accesses the RACH notifies the base station of information of channel quality as to whether the user equipment is preferably allocated with which channel through the RACH pilot, a favorable channel can be allocated to the user equipment during scheduling, whereby communication of good quality can be maintained.

Accordingly, the RACH pilot that can be used for the user equipment which accesses the RACH is separately allocated to the sub-frame which includes RACH. Thus, the user equipment which accesses the RACH sends a preamble to the base station through the corresponding RACH and also sends a pilot for transmission of channel quality information to the designated RACH pilot. The RACH pilot is a sequence designated depending on a preamble, and it is preferable that the user equipments, which use different preamble sequences, use different RACH pilot sequences if possible or select RACH pilot of different sub-carriers or partially overlapped sub-carriers.

Figure 10:
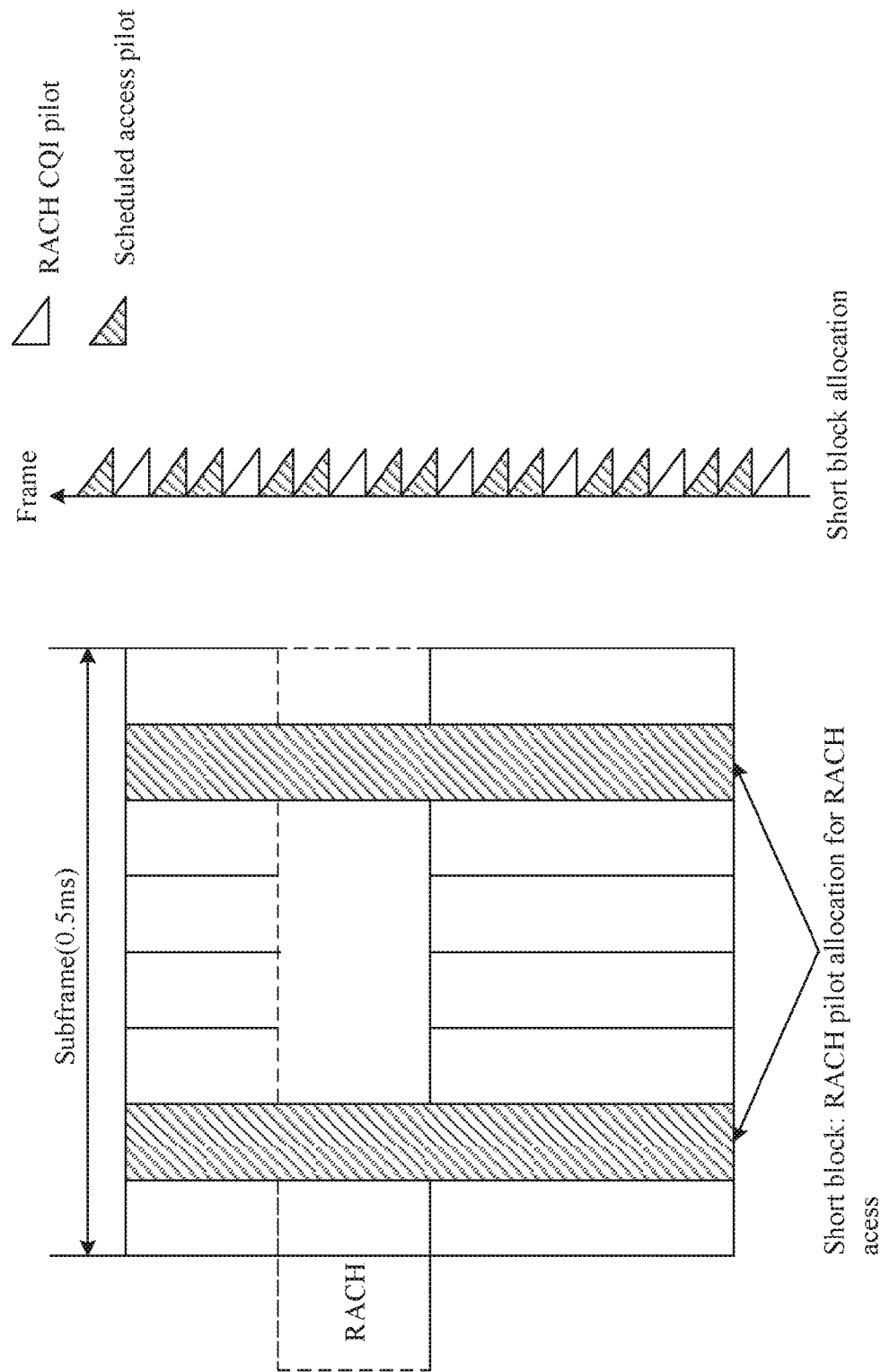
FIG. 10 illustrates a structure of a random access channel of a sub-frame to which RACH pilot is allocated.

FIG. 10 is a diagram illustrating a structure of a random access channel of a sub-frame to which the RACH pilot is allocated. It is noted that each sub-frame includes at least one short block to which at least one RACH pilot and access pilot are allocated at a predetermined pattern. In this case, the RACH pilot exists in the frequency band of the allocated RACH and other system bands. In this embodiment, it has been described that two short blocks exist per one frame and the RACH pilot is transmitted to the short blocks. However, the present invention is not limited to such embodiment, and various modifications can be made within the apparent range by those skilled in the art.

As described above, it has been described that preamble, synchronization timing information including pilot information, uplink resource allocation information and message such as uplink data can be transmitted through the RACH of various structures. It will be apparent that the data transmission method according to the embodiments of the present invention can be used in the RACH and other channels.

Meanwhile, the preamble and the message may separately be transmitted through the RACH. Alternatively, the message may be transmitted by being implicitly included in the preamble. One embodiment of the present invention relates to a method of transmitting a preamble through the latter transmission manner. In one embodiment of the present invention, a code sequence more expanded than that of the related art can be used for effective transmission of the preamble. Hereinafter, a method of improving CAZAC sequence according to one embodiment of the present invention for effective transmission of the preamble will be described.

Since the receiver should search a start position of a transmission signal in the random access channel, it is generally designed that a transmission signal has a specific pattern in a time domain. To this end, the preamble is transmitted repeatedly or a certain interval is maintained between sub-carriers in a frequency domain to obtain repetitive characteristics in the time domain, thereby identifying time synchronization.

In the former case, the preamble represents a reference signal used for the purpose of initial synchronization setting, cell detection, frequency offset, and channel estimation. In a cellular mobile communication system, a sequence having good cross-correlation characteristic is preferably used for repetitive transmission of the preamble. To this end, binary hardamard code or poly-phase CAZAC sequence may be used. Particularly, the CAZAC sequence has been estimated that it has excellent transmission characteristics as it is expressed by a Dirac-Delta function in case of auto-correlation and has a constant value in case of cross-correlation.

The CAZAC sequence can be classified into GCL sequence (Equation 1) and Zadoff-Chu sequence (Equation 2) as follows.

$$c(k; N, M) = \exp\left(-\frac{j\pi Mk(k+1)}{N}\right) \text{ for odd } N \quad \text{[Equation 1]}$$
$$c(k; N, M) = \exp\left(-\frac{j\pi Mk^2}{N}\right) \text{ for even } N$$

$$c(k; N, M) = \exp\left(\frac{j\pi Mk(k+1)}{N}\right) \text{ for odd } N \quad \text{[Equation 2]}$$
$$c(k; N, M) = \exp\left(\frac{j\pi Mk^2}{N}\right) \text{ for even } N$$

In the above Equations, it is noted that if the CAZAC sequence has a length of N, actually available sequences are limited to N−1 number of sequences. Accordingly, it is necessary to increase the number of CAZAC sequences to efficiently use them in an actual system.

For example, a method of expanding the number of available sequences by 1 is suggested by providing an improved CAZAC sequence p(k) in such a way to multiply a CAZAC sequence c(k) by a predetermined modulation sequence m(k). In other words, assuming that Zadoff-Chu sequence is used as the CAZAC sequence, the CAZAC sequence c(k), the modulation sequence m(k) and the improved CAZAC sequence p(k) can be defined by the following Equations 3, 4, and 5, respectively.

CAZAC sequence: [Equation 3]
$$c(k; N, M) = \exp\left(\frac{j\pi Mk(k+1)}{N}\right)$$

Modulation sequence: [Equation 4]
$$m(k) = \exp\left(\frac{j2\pi\delta}{N}k\right)$$

Improved CAZAC sequence (or improved preample): [Equation 5]
$$p(k) = c(k)*m(k) = \exp\left(\frac{j\pi M}{N}k(k+1) + \frac{j2\pi\delta}{N}k\right)$$

The improved CAZAC sequence p(k) maintains auto-correlation and cross-correlation characteristics of the CAZAC sequence. The following Equation 6 illustrates auto-correlation characteristic of p(k), and it is noted from the Equation 6 that the final result is a Dirac-delta function. In particular, if the modulation sequence m(k) is a sequence having a certain phase, it is characterized in that the modulation sequence m(k) always maintains the auto-correlation characteristic.

$$ad(d) = \sum_k \exp\left(\frac{j\pi M}{N}(k+d)(k+d+1) + \frac{j2\pi\delta}{N}(k+d)\right) \quad \text{[Equation 6]}$$
$$\exp\left(-\frac{j\pi M}{N}k(k+1) - \frac{j2\pi\delta}{N}k\right)$$
$$= \sum_k \exp\left(\frac{j2\pi M}{N}(2dk + d(d+1)) + \frac{j2\pi\delta}{N}d\right)$$
$$= \exp\left(\frac{j2\pi\delta}{N}d\right)\sum_k \exp\left(\frac{j\pi M}{N}(2dk + d(d+1))\right)$$
$$= \begin{cases} 1 & d = 0 \\ 0 & d \neq 0 \end{cases}$$

Furthermore, the following Equation 7 illustrates cross-correlation characteristic of p(k).

$$cc(d) = \sum_k \exp\left(\frac{j\pi(M+x)}{N}(k+d)(k+d+1) + \frac{j2\pi\delta}{N}(k+d)\right) \quad \text{[Equation 7]}$$
$$\exp\left(-\frac{j\pi M}{N}k(k+1) - \frac{j2\pi\delta}{N}k\right)$$
$$= \sum_k \exp\left(\frac{j\pi x}{N}(k+d)(k+d+1)\right)$$
$$\exp\left(\frac{j\pi M}{N}(k+d)(k+d+1) + \frac{j2\pi\delta}{N}(k+d)\right)$$
$$\exp\left(-\frac{j\pi M}{N}k(k+1) - \frac{j2\pi\delta}{N}k\right)$$
$$= \sum_k \exp\left(\frac{j\pi x}{N}(k+d)(k+d+1)\right)$$
$$\exp\left(\frac{j\pi M}{N}(2dk + d(d+1)) + \frac{j2\pi\delta}{N}d\right)$$
$$= \exp\left(\frac{j\pi M}{N}d(d+1)\right)\sum_k \exp\left(\frac{j\pi x}{N}(k+d)(k+d+1)\right)$$
$$\exp\left(\frac{j2\pi dM}{N}k\right)$$

In this case, although Equation 7 seems to be similar to Equation 6, it is noted that in view of summation term, auto-correlation is expressed by sum of exponential but cross-correlation is expressed by the product of two sequences. The first terra is another CAZAC sequence of which seed value is x, and the second term is a simple exponential function. The sum of the product of two sequences is equal to obtaining a coefficient of the exponential function, and its value is equal to a value obtained by converting the CAZAC sequence of which seed value is x into a frequency domain and extracting a value from the frequency position of exponential.

Since the CAZAC sequence has auto-correlation of Dirac-delta characteristic, if it undergoes Fourier transform, it maintains auto-correlation characteristic of Dirac-delta of a constant amplitude even in the transformed area. For this reason, if values of specific positions are extracted from the frequency domain, their sizes are 1 and equal to each other but their phases are different from each other. Accordingly, if this result is added to the Equation 7 to obtain cross-correlation, the obtained cross-correlation can briefly be expressed by the following Equation 8.

$$cc(d) = \exp\left(\frac{j\pi M}{N}d(d+1) + \frac{j2\pi\delta}{N}d\right)$$
$$\sum_k \exp\left(\frac{j\pi x}{N}(k+d)(k+d+1)\right)$$
$$\exp\left(\frac{j2\pi dM}{N}k\right)$$
$$= \exp\left(\frac{j\pi M}{N}d(d+1) + \frac{j2\pi\delta}{N}d\right)C(dM/N;x)$$

[Equation 8]

It is noted from the Equation 8 that since C(dM/N;x) always has a size of 1 and an exponential term also has a size of 1, the cross-correlation is always fixed at 1.

After all, characteristics of the related art CAZAC sequence can be maintained by the Equation 5 and at the same time the number of codes can be increased. This means that the result in the area where the exponential terms are multiplied is equal to applying circular shift to the Fourier transformed area, and multiplying exponential sequences in the time domain is equal to performing circular shift in the frequency domain.

In other words, it is noted that if correlation between two sequences p(k;M,N,d1) and p(k;M,N,d2) of which seed values are equal to each other is obtained, impulse occurs in a point where a delay value d in cross-correlation reaches d1-d2. Although design of the improved sequence as above has the same result as that of circular shift of the CAZAC sequence, this embodiment of the present invention is advantageous in that the result can be obtained by a simple procedure such as multiplying two exponential sequences without Fourier inverse transform after Fourier transform and circular shift.

Hereinafter, a method of improving data transmission reliability of a preamble by performing predetermined data processing for the related art code sequence and a method of expanding a length of a code sequence when data are simultaneously transmitted will be described. If the CAZAC sequence is used as the code sequence, the CAZAC sequence expanded by the above method is preferably used. However, the CAZAC sequence is not necessarily limited to the CAZAC sequence expanded by the above method, and the related art CAZAC sequence may be used.

First of all, a structure of transmission data, i.e., preamble, which is commonly applied to the embodiments of the present invention, will be described.

In a 3GPP LIE (Long Term Evolution) system, a transmitter can repeatedly transmit the same sequence two times or more so as to allow a receiver to easily detect transmission data or improve additional detection performance (i.e., increase of spreading gain). Accordingly, since the receiver only needs to detect repetitive patterns regardless of the type of the received sequence, it can simply identify time position of a user equipment which accesses the RACH and improve detection performance.

Figure 11:
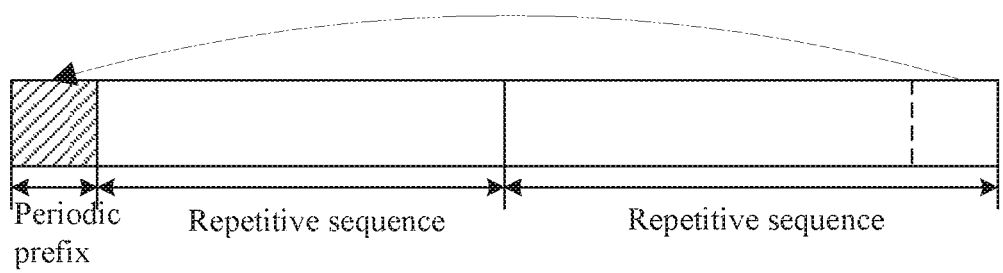
FIG. 11 illustrates a repetitive structure of a preamble according to one embodiment of the present invention.

FIG. 11 is a diagram illustrating a structure of a preamble according to one embodiment of the present invention. In an orthogonal frequency divisional transmission system, a cyclic prefix (CP) is used, in which the last part of OFDM symbol is copied and then prefixed to the OFDM symbol to compensate a multi-path loss in signal transmission. Accordingly, if the OFDM symbol consists of two repetitive preambles, a part of the preamble of the later order is copied in the first part by CP to enable compensation of the multi-path loss for the corresponding preamble. Also, the CP is advantageous in that it is easy to identify user equipments which access different RACHs in case of CAZAC having good periodic correlation.

Since inter-symbol interference does not occur even though a single sequence is transmitted by prefixing CP thereto instead of repetitive transmission of sequence, a predetermined receiving algorithm can be realized in the frequency domain without any problem. However, if the receiver realizes a receiving algorithm in the time domain with neither repetitive transmission nor CP, the receiver should detect all kinds of code sequences to identify user equipments which access the RACH. In this respect, the preamble is preferably realized by a structure of a repetitive pattern. At this time, whether to realize a repetition pattern can be determined depending on a data rate supported by the system or the number of repetitive times can be determined if a repetitive pattern is realized. For example, to support a minimum data rate supported by the system, RACH preamble can repeatedly be transmitted one or more times depending on the length of the sequence.

First to fourth embodiments which will be described later relate to a data processing method of a sequence constituting the structure of the preamble. In these embodiments, data transmitted to the receiver could be the structure of the preamble of FIG. 11 or a partially omitted structure (having neither repetitive transmission nor CP). Although it is assumed that the CAZAC sequence is used as the code sequence for data transmission, the code sequence is not necessarily limited to the CAZAC sequence. Every sequence having excellent transmission characteristic, such as Hadarmad code and gold code, can be used as the code sequence.

First Embodiment

To transmit data, a landmark that can be identified is generally required for transmission signal constituting data. In this embodiment, conjugation is used as the landmark. Since a phase variation width between a conjugated transmission signal and other transmission signal is very great, interference between transmission signals decreases, whereby reliability of data transmission can be improved in spite of influence of channel.

Figure 12:
FIG. 12 is a structural view of unit data to illustrate one embodiment of the present invention, which transmits data by using a code sequence expanded through conjugation.

FIG. 12 illustrates a method of transmitting data through conjugation according to one embodiment of the present invention. In the embodiment of FIG. 12, one CAZAC sequence is divided into four blocks, and '0' or '1' indicates whether to perform conjugate for each block. For example, it may be promised that a block which is not conjugated is expressed by '0', and a block which is conjugated is expressed by '1.' In this way, one CAZAC sequence can express information of 4 bits. In other words, if one CAZAC sequence is divided into N number of blocks, information of N bits can be expressed.

At this time, in a single CAZAC sequence of a long length corresponding to a length of transmission data, a part of the single CAZAC sequence, which corresponds to a specific block having a value of 1, may be conjugated. Also, in a plurality of CAZAC sequences of a short length corresponding to each block length of transmission data, a CAZAC sequence corresponding to a specific block having a value of 1 may be conjugated.

Figure 13:
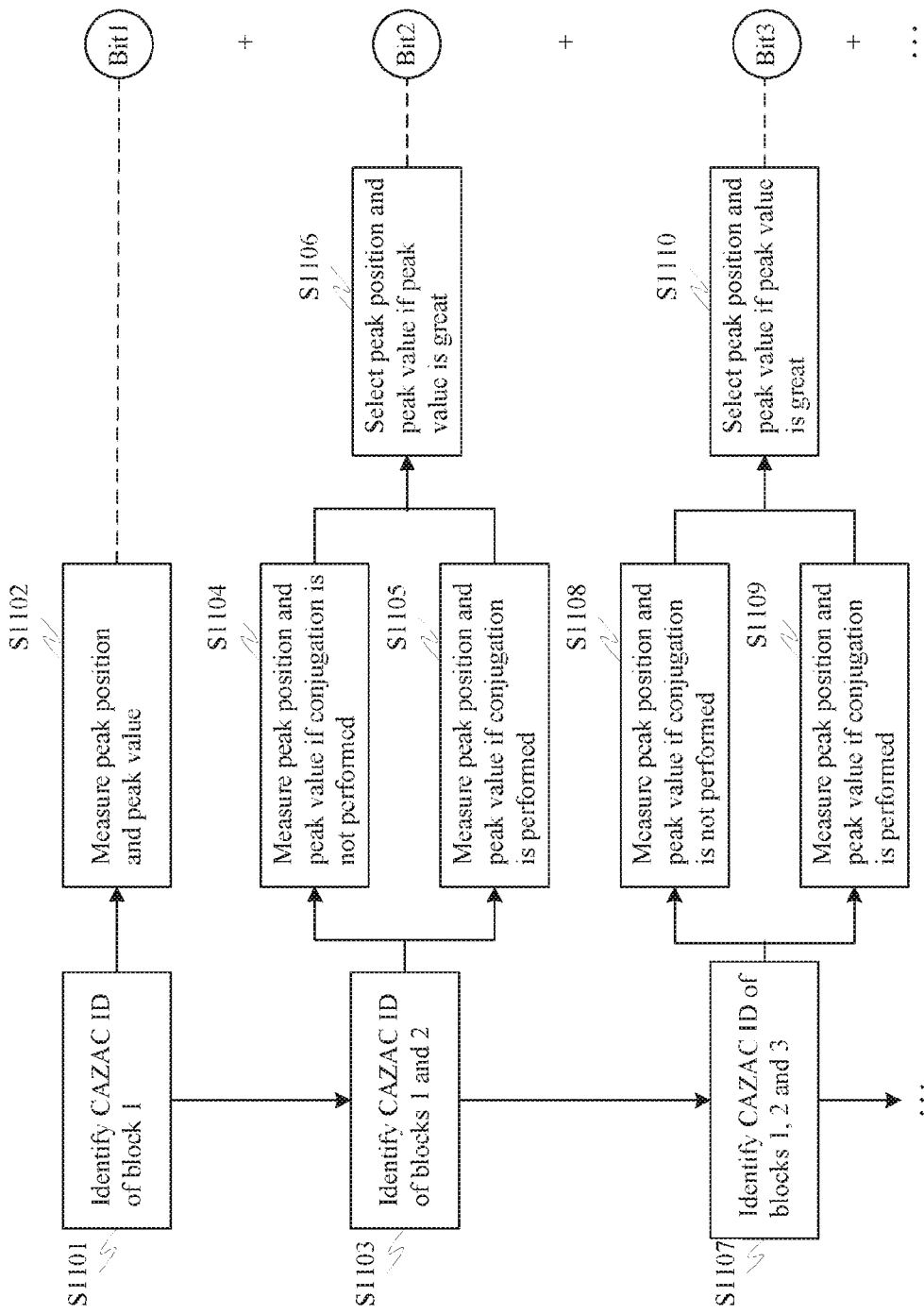
FIG. 13 is a flow chart illustrating a procedure of receiving and decoding data transmitted in a code sequence expanded through conjugation in accordance with one embodiment of the present invention.

FIG. 13 is a diagram illustrating an example of a method of receiving and decoding the sequence transmitted through conjugation from the transmitter in accordance with one embodiment of the present invention.

It is preferable that the transmitter always allocates a value of 0 to the first block of the transmission data so that the first block is used as a reference later. Accordingly, the receiver identifies sequence ID for the received first block (S1101), and then measures a peak by using only the corresponding block (S1102). Next, the receiver identifies sequence IDs for the first and second blocks (S1103), and then measures a peak by using the first and second blocks together. At this time, since it is unclear whether the sequence of the second block is in the conjugated status, the receiver respectively measures a peak corresponding to the case where the corresponding block is conjugated (S1104) and a peak corresponding to the case where the corresponding block is not conjugated (S1105), and then selects greater one of the two peaks (S1106). Subsequently, the receiver identifies sequence IDs for the first to third blocks (S1107), and then measures a peak by using the first to third blocks together. In this case, since it is unclear whether the sequence of the third block is in the conjugated status, the receiver respectively measures a peak corresponding to the case where the corresponding block is conjugated (S1108) and a peak corresponding to the case where the corresponding block is not conjugated (S1109), and then selects greater one of the two peaks (S1110). In this way, decoding is performed for the first block to the last block so that the original data is finally decoded.

Second Embodiment

Figure 14:
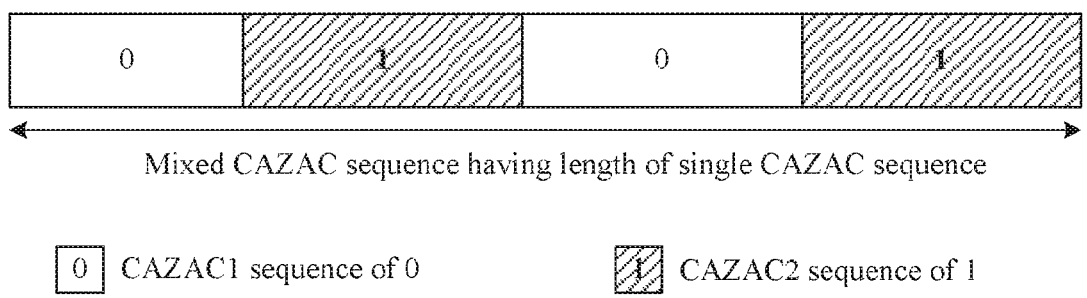
FIG. 14 is a structural view of unit data to illustrate one embodiment of the present invention, which transmits data by using a code sequence expanded through grouping.

FIG. 14 is a diagram illustrating a method of transmitting data using a sequence according to another preferred embodiment of the present invention. Although data transmission is performed by change of the sequence in the first embodiment, in this embodiment, a type of a sequence for expressing one block is divided into a sequence (first sequence) for a block value of '0' and a sequence (second sequence) for a block value of '1,' and the first and second sequence are grouped. In this case, since the receiver detects only sequence ID (ID of the first sequence or ID of the second sequence) for each block, the receiver is less affected by noise or channel.

All sequences are expressed by one group "$\{c_0(k;M_i), c_1(k;M_j)\}$" by grouping two sub-sequences (first sequence and second sequence) (i and j are integers different from each other). In this case, $c_0(k;M_i)$ is the first sequence for the block value of 0 (or bit value), and $c_1(k;M_j)$ is the second sequence for the block value of 1. At this time, a CAZAC sequence of a long length corresponding to a length of transmission data may be used as each sub-sequence constituting each group. Alternatively, a CAZAC sequence of a short length corresponding to each block length of transmission data may be used as each sub-sequence constituting each group.

Figure 15:
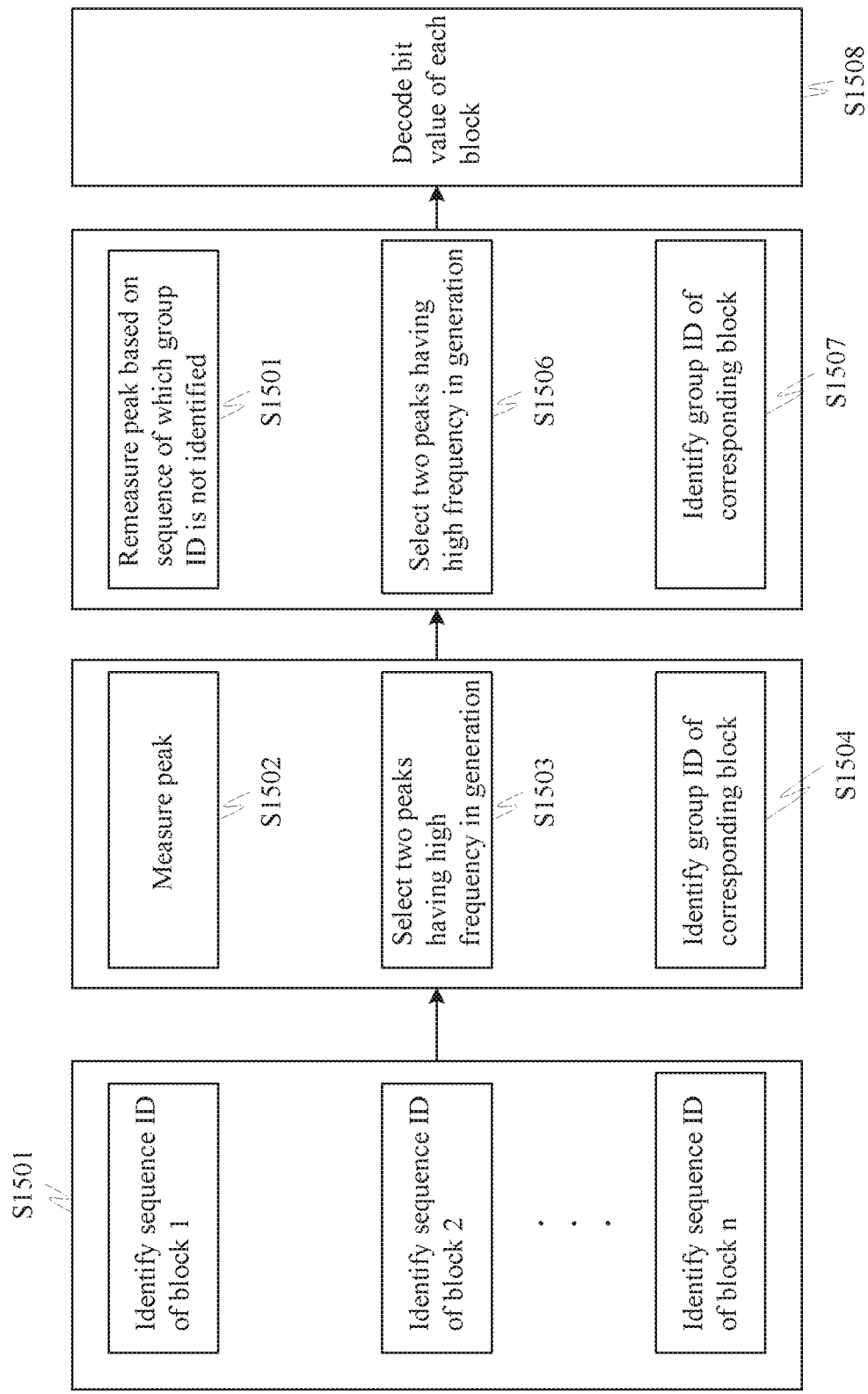
FIG. 15 is a flow chart illustrating a procedure of receiving and decoding data transmitted in a code sequence expanded through grouping.

Meanwhile, the receiver identifies sequence ID of each block, and identifies a type of the sequence (first sequence or second sequence) for each block from a sequence ID set consisting of the identified sequence IDs. At this time, the type of the sequence for each block can be expressed by group ID. In other words, in this embodiment, since it is assumed that code values of each block can be expressed by 0 and 1, two types of the sequence for each block or two types of group ID are obtained. The code values of each block can be restored through group ID. This decoding procedure will be described in detail with reference to FIG. 15.

The receiver identifies sequence ID of each block constituting a corresponding sequence if the sequence is received (S1501), and measures a peak for a sequence ID set consisting of the identified sequence IDs (S1502). In this case, two peaks having high frequency in generation are selected (S1503) so that sequences which generate the corresponding peaks are identified as the first sequence and the second sequence constituting the group. At this time, if the first sequence and the second sequence are expressed by predetermined group IDs, respectively, first group ID indicating a code value of 0 and second group ID indicating a code value of 1 can be identified. After all, group ID of each block can be identified through the step S1503 (S1504), and thus the code value of each block can be identified (S1508).

If sequence IDs that can not identify group ID exist due to error occurring during the decoding procedure, peaks are searched for a set of corresponding sequence IDs (S1505), and among the peaks, two powerful peaks are detected (S1506) so that group IDs are again identified from the detected powerful peaks (S1507). Subsequently, code values of the corresponding blocks can be identified from the identified group IDs (S1508).

Third Embodiment

FIG. 16 is a diagram illustrating a method of transmitting data using a sequence according to another preferred embodiment of the present invention.

If the second embodiment is more expanded, a total number of data bits that can be transmitted through one group can be increased. For example, if two sequences are defined as one group like the second embodiment, data of 1 bit per block can be transmitted. If four sequences are defined as one group, data of 2 bits per block can be transmitted. If eight sequences are defined as one group, data of 3 bits per block can be transmitted. However, since a plurality of sequences are grouped and defined as one set, a problem occurs in that if the length of each sequence is short, the number of groups that can be selected is decreased in proportion to the short length of each sequence.

Accordingly, it is necessary to expand the length of the sequence to increase the number of groups that can be selected. To this end, in this embodiment, the length of the sequence for each block is expanded while respective sequences are multi-overlapped as shown in FIG. 16B and independence is maintained, owing to transmission delay between the overlapped sequences.

Referring to FIG. 16(*a*), a data value of 2 bits is given to each block. Accordingly, a sequence group for each block consists of four different CAZAC sequences. Since each CAZAC sequence constituting the sequence group should identify four values, a group size should be increased correspondingly. However, in this case, a problem occurs in that the number of groups that can be used by each base station is decreased. Accordingly, as shown in FIG. 16, the length of each CAZAC sequence is expanded as much as need be while a predetermined delay is given to each CAZAC sequence during data transmission, whereby independence is maintained between the respective CAZAC sequences.

Figure 17:
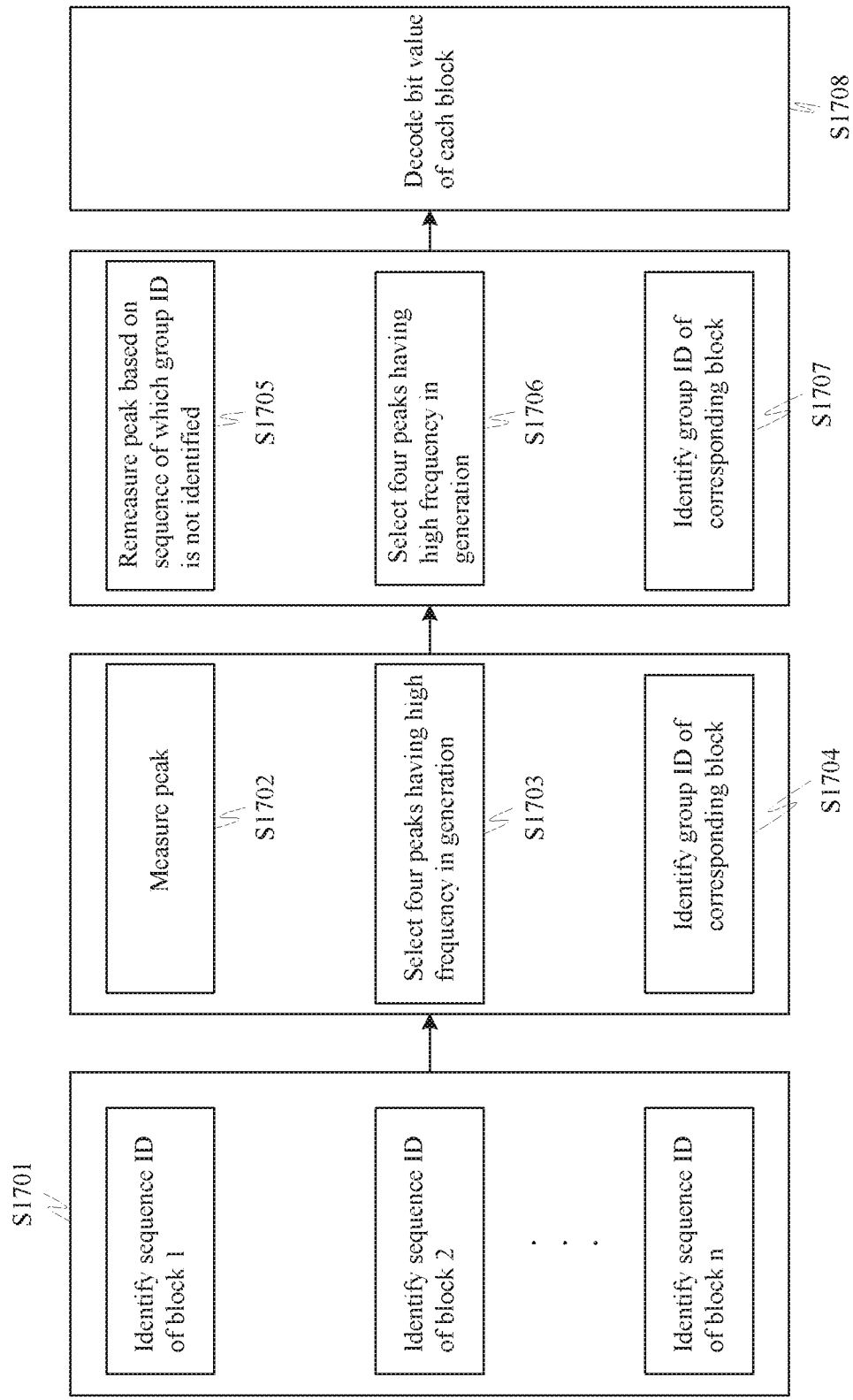
FIG. 17 is a flow chart illustrating a procedure of receiving and decoding data transmitted in a code sequence expanded through grouping and delay processing.

Meanwhile, the receiver identifies ID of a corresponding block based on the order of each CAZAC sequence represented in the time/frequency domain, and its method of decoding a code value from corresponding block ID is almost identical with that of the second embodiment. Hereinafter, a data decoding procedure of the receiver will be described in detail with reference to FIG. 17.

The receiver identifies sequence ID of each block constituting a corresponding sequence if the sequence is received (S1701), and measures a peak for a sequence ID set consisting of the identified sequence IDs (S1702). In this embodiment, since one block expresses two bits, first, second, third and four sequences which express 00, 01, 10, 11 form one group. Accordingly, the receiver should select 4 peaks having high frequency in generation as a result of measurement (S1703). In this case, the selected peaks are respectively mapped to the first, second, third and fourth sequences in accordance with the order represented in the time/frequency domain. Also, if the first sequence to the fourth sequence are expressed by predetermined group IDs, respectively first group ID indicating a code value of 00, second group ID indicating a code value of 01, third group ID indicating a code value of 10, and fourth group ID indicating a code value of 11 can be identified. After all, group ID of each block can be identified through the step S1703 (S1704), and thus the code value of each block can be identified (S1708).

If sequence IDs that can not identify group ID exist due to error occurring during the decoding procedure, peaks are again searched for a set of corresponding sequence IDs (S1705), and among the peaks, four powerful peaks are detected (S1706) so that group IDs are again identified from the detected powerful peaks (S1707). Subsequently, code values of the corresponding blocks can be identified from the identified group IDs (S1708).

Fourth Embodiment

Figure 18:
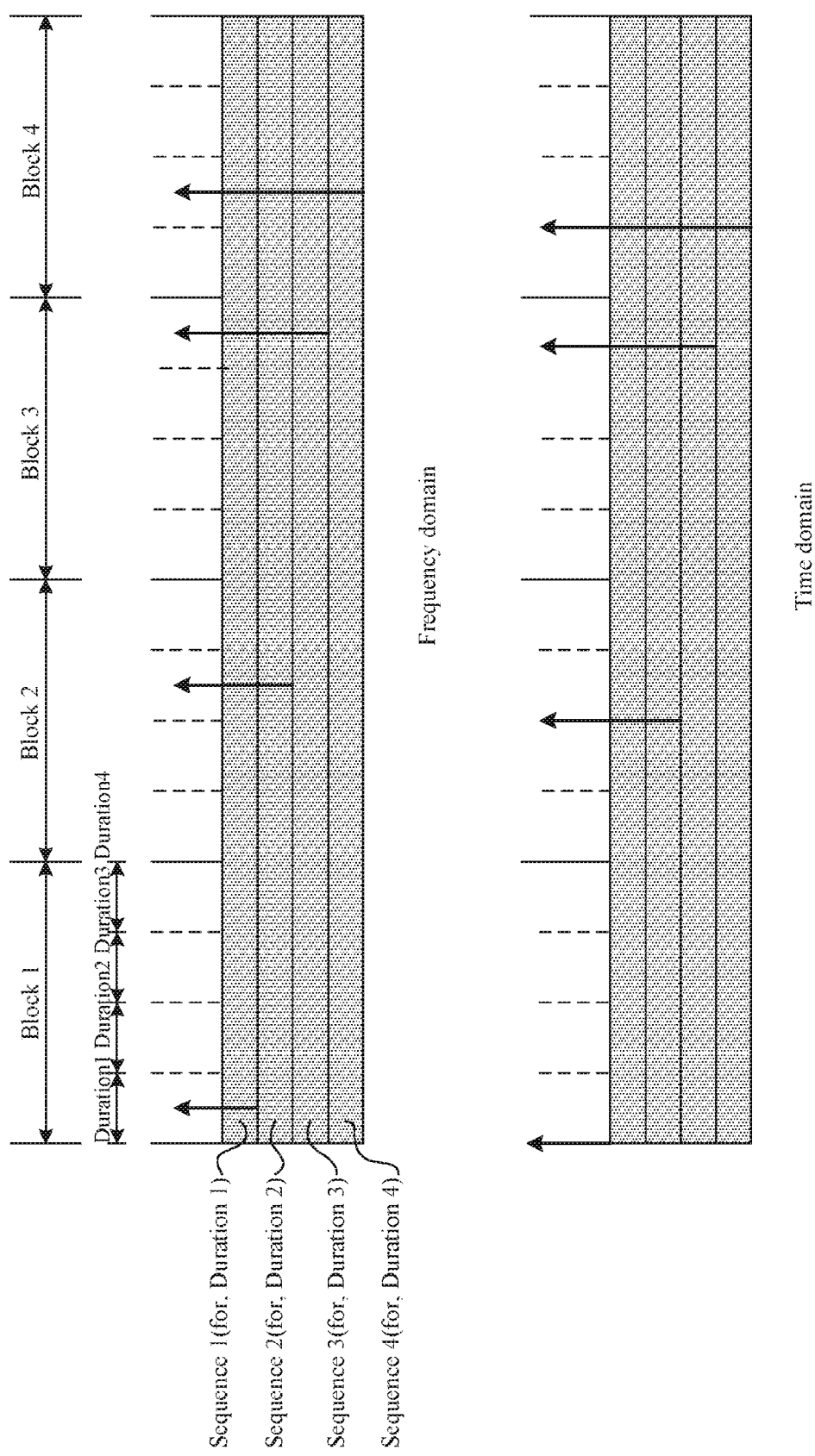
FIG. 18 is a structural view of unit data to illustrate one embodiment of the present invention, which transmits data by using a code sequence expanded through PPM modulation.

FIG. 18 is a diagram illustrating a method of transmitting data using a sequence according to another preferred embodiment of the present invention.

In the case that the second embodiment and the third embodiment are more expanded, the signal position is changed through pulse position modulation (PPM) so that the length of the sequence can be expanded logically. The PPM originally transmits data with relative pulse delay but PPM based on start position of the sequence is used in this embodiment.

If bits of data to be transmitted are determined, the base station selects a sequence to be used for transmission of corresponding data and determines a length of a block for applying PPM to a corresponding sequence and a length of a duration constituting each block. A sequence corresponding to each block is separately required when a preamble is generated. However, in this embodiment, since circular shift equivalent to a specific duration within a specific block constituting a corresponding sequence is applied for the same sequence, the respective sequences are originally the same as one another but are identified from one another by circular shift.

For example, assuming that one sequence length is divided into four blocks (block 1 to block 4) and each block is expressed by 2 bits, each block is again divided into four durations (duration 1 to duration 4) to express values of "00, 01, 10, 11." At this time, four durations included in one block are used as start identification position f circular shift for a sequence corresponding to a corresponding block. If a preamble to be transmitted has a total length of 256, block 1 can have a circular shift value of 0~63, block 2 64~127, block 3 128~195, and block 4 196~255. If a specific sequence to be used for transmission of the preamble is determined and "00" is transmitted through block 1, sequence 1 undergoes circular shift so that a start position is arranged in duration 1 (0~15) of block 1. If "10" is transmitted to block 2, sequence 2 undergoes circular shift so that a start position is arranged in duration 3 (96~111) of block 2. In this way, circular shift is applied for the other blocks and then the respective sequences (sequence 1 to sequence 4) are grouped into one to generate one preamble. In this case, the number of blocks can be generated from 1 to every random number. Also, a minimum unit of circular shift can be limited to more than a certain value considering channel or timing error.

Figure 19:
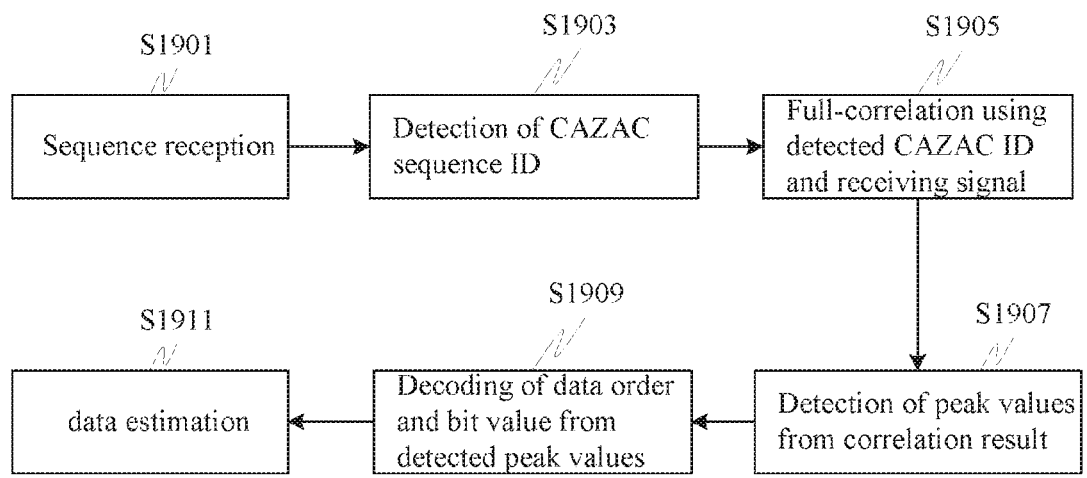
FIG. 19 is a flow chart illustrating a procedure of receiving and decoding data transmitted in a code sequence expanded through PPM modulation.

Meanwhile, the receiver identifies respective sub sequences (sequence 1 to sequence 4) constituting corresponding sequences by data processing the transmitted sequences, and searches a start position of each of the identified sequences to perform data decoding. This will be described in detail with reference to FIG. 19.

If a sequence is received in the receiver (S1901), the detects ID of the corresponding sequence (S1903) and performs full correlation through predetermined data processing for a total of received signals (received sequence) by using the detected result (S1905). At this time, a full search algorithm or a differential search algorithm can be used for detection of the sequence ID.

Since the received signal is transmitted from the transmitter by gathering a plurality of sequences, the signal which has undergone the correlation includes a plurality of peaks. In this embodiment, four peaks are detected, and the receiver determines whether each of the detected peaks corresponds to which one of block 1 to block 4 and also corresponds to which duration of a corresponding block (S1909) to decode bit order and bit value of the original data (S1911).

Figure 20A:
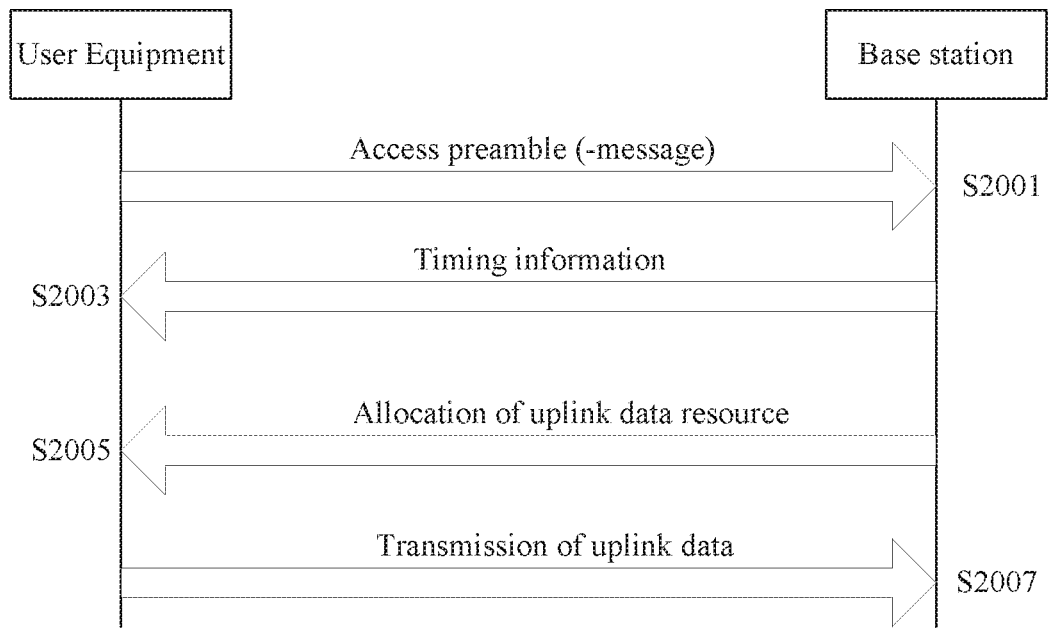
FIG. 20A and FIG. 20B are flow charts illustrating a procedure of performing synchronization in a random access channel in accordance with a data transmission method of the present invention.
Figure 20B:
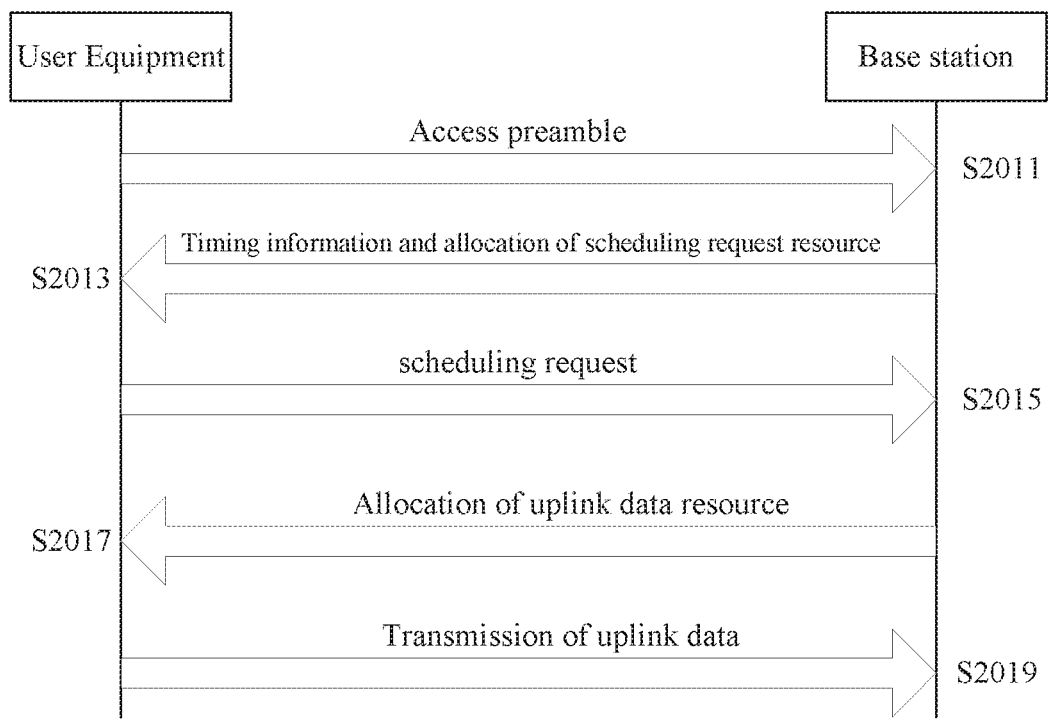

The method of effectively transmitting the preamble sequence and message through the RACH has been described as above. Finally, a procedure of transmitting a preamble from a user equipment (UE) to a base station (Node-B) and performing synchronization between both the user equipment and the base station will be described based on two embodiments. FIG. 20A and FIG. 20B illustrate the two embodiments.

In the embodiment of FIG. 20A, synchronization is performed in such a manner the user equipment accesses the base station only once. In other words, if the user equipment transmits a preamble and a messing including information required for synchronization to the base station (S2001), the base station transmits timing information to the user equipment (S2003) and at the same time allocates a resource for transmission of uplink data (S2005). The user equipment transmits the uplink data to the base station through the allocated resource (S2007).

In the embodiment of FIG. 20B, for synchronization, the user equipment accesses the base station twice. In other words, if the user equipment transmits a preamble to the base station (S2011), the base station transmits timing information to the user equipment and at the same time allocates a resource for a request of scheduling (S2013). The user equipment transmits a message fir a request of scheduling to the base station through the allocated resource (S2015). Then, the base station allocates a resource for transmission of uplink data to the user equipment (S2017). In this way, the user equipment transmits to the uplink data to the base station through the secondly allocated resource (S2019).

Figure 21:
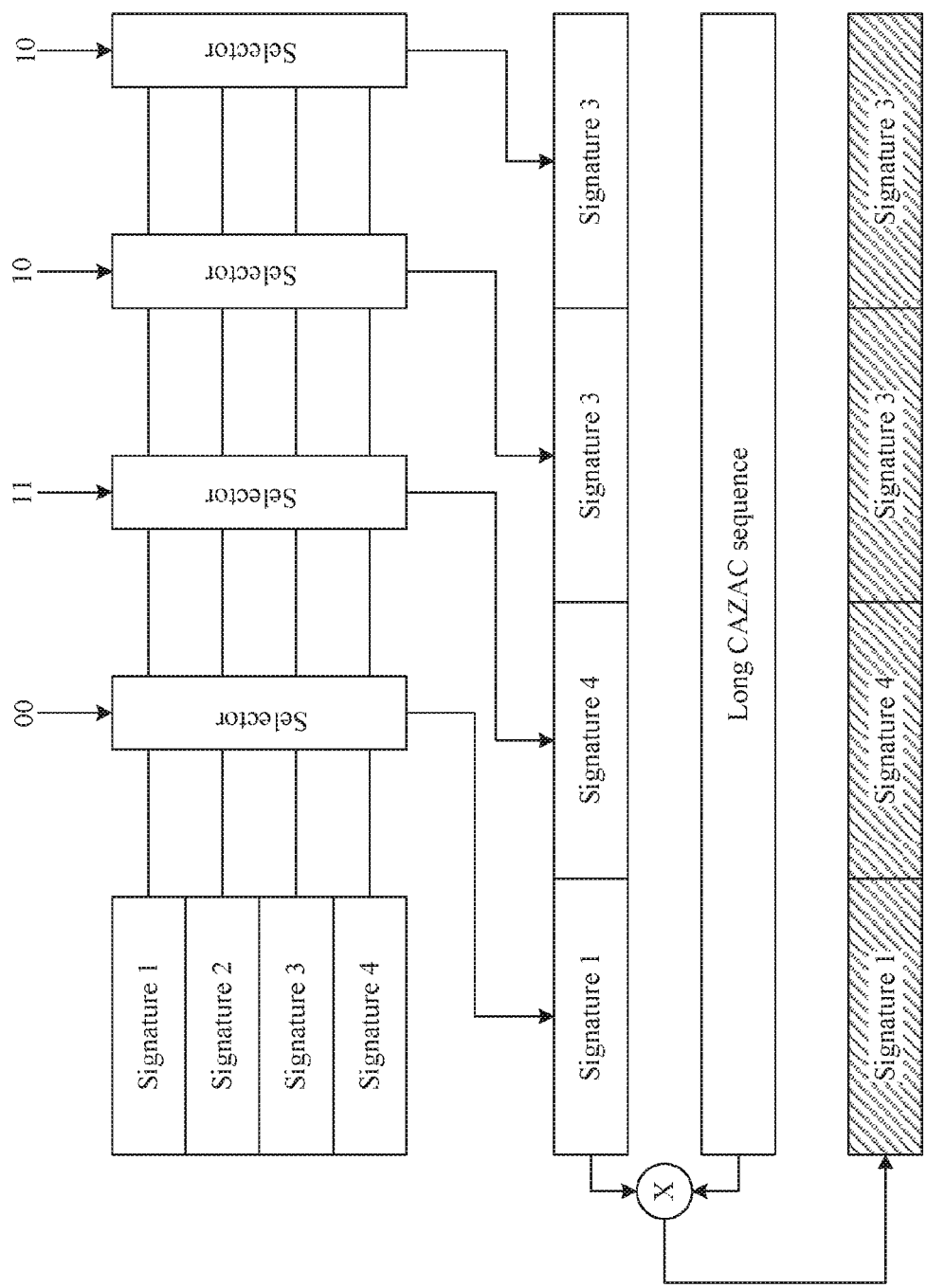
FIG. 21 illustrates a method of transmitting data to a receiver through a signaling channel in accordance with one embodiment of the present invention.

FIG. 21 is a diagram illustrating a method of transmitting data to a receiver through a signaling channel in accordance with one embodiment of the present invention.

Since the receiver should search a start position of a transmission signal in actually realizing the random access channel, it is generally designed that the random access channel has a specific pattern in the time domain. To this end, a preamble sequence may be used so that the random access signal originally has a repetitive pattern. Alternatively, a certain interval may be maintained between subcarriers in the frequency domain to obtain repetitive characteristics in the time domain. Accordingly, the access modes of FIG. 6A and FIG. 6B are characterized in that the start position of the transmission signal should easily be searched in the time domain. To this end, the CAZAC sequence is used. The CAZAC sequence can be classified into GCL sequence (Equation 1) and Zadoff-Chu sequence (Equation 2).

Meanwhile, a specific sequence of a long length is preferably used to transmit unique information of the user equipment or the base station through RACH (Random Access Channel) or SCH (Synchronization Channel). This is because that the receiver easily detects corresponding ID and more various kinds of sequences can be used to provide convenience for system design.

However, if message is transmitted with corresponding ID at a sequence of a long length, since the quantity of the message is increased by $\log_2$ function, there is limitation in message passing with ID only when the sequence exceeds a certain length. Accordingly, in this embodiment, the sequence is divided by several short blocks, and a short signature sequence corresponding to data to be transmitted to each block of the sequence is used instead of specific manipulation such as conjugation or negation.

Referring to FIG. 21, the sequence is divided into a predetermined number of blocks, and a short signature sequence corresponding to data to be transmitted is applied for each of the divided blocks. A long CAZAC sequence is multiplied by combination of the blocks for which the short signature sequence is applied, whereby a final data sequence to be transmitted to the receiver is completed.

In this case, assuming that the short signature sequence consists of four signatures, the following signature sets can be used. Also, if there is difference between respective data constituting the signature sets, any other signature set may be used without specific limitation.

1) Modulation values: $\{1+j, 1-j, -1+j\}$
2) Exponential sequence: $\{[exp(jw_0n)], [exp(jw_1n)], [exp(jw_2n)], [exp(jw_3n)]\}$, where n–0 ... Ns, and Ns is a length of each block
3) Walsh Hadamard sequence: $\{[1111], [1-11-1], [11-1-1], [1-1-11]\}$, where, if the length Ns of each block is longer than 4, each sequence is repeated to adjust the length.

Examples of the long CAZAC sequence that can be used in the embodiment of FIG. 21 include, but not limited to, one GCL CAZAC sequence, Zadoff-Chu CAZAC sequence, and a sequence generated by concatenation of two or more short GCL or Zadoff-Chu CAZAC sequences having the same length or different lengths.

The aforementioned manner of applying a short signature sequence for data transmission and reception to the long CAZAC sequence is advantageous in that it is less affected by channel than the related art modulation method of transmission data and performance is little decreased even though the number of bits constituting one signature is increased.

Figure 22:
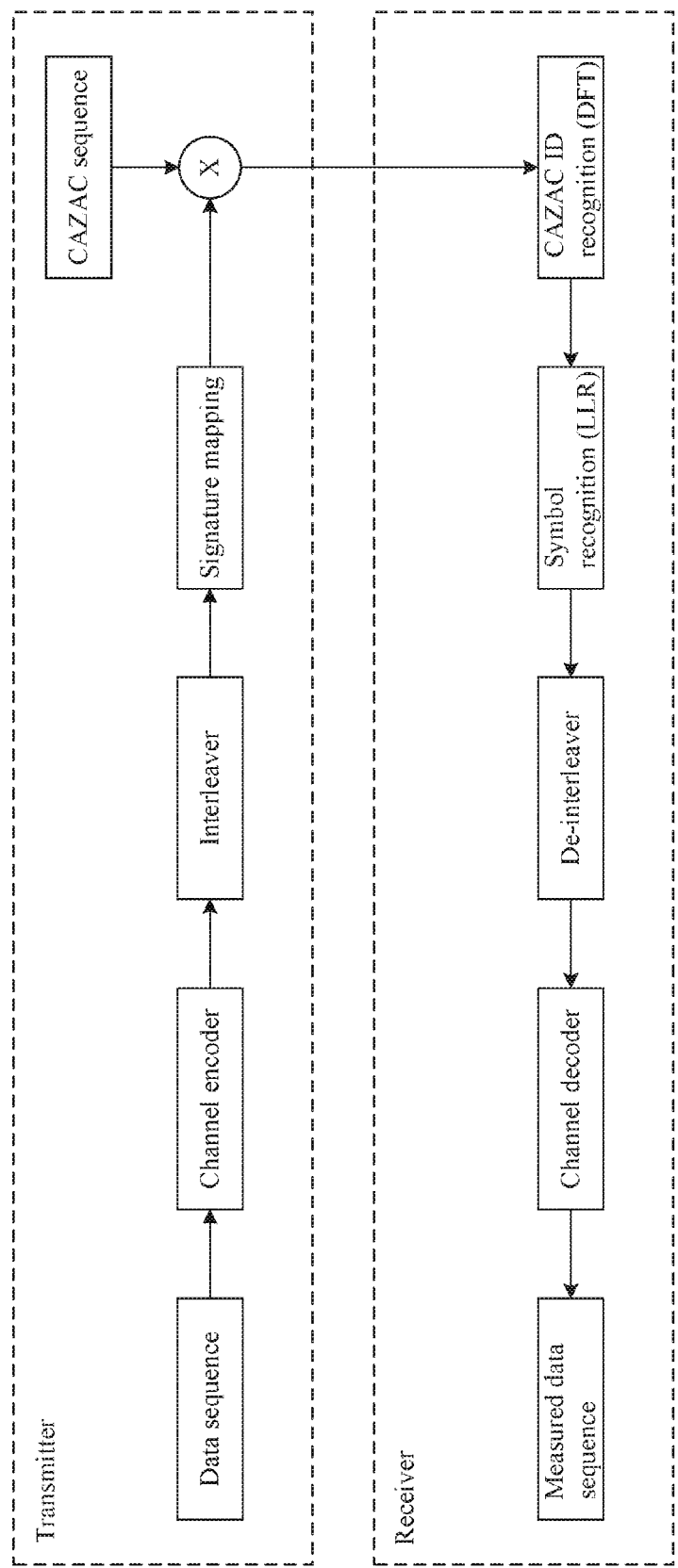
FIG. 22 illustrates an example of a receiver and a transmitter for transmitting a preamble and data through RACH, SCH or other channel in accordance with one embodiment of the present invention.

FIG. 22 illustrates an example of a receiver and a transmitter for transmitting a preamble and data through RACH, SCH or other channel by using the aforementioned manner.

Since the number of bits can be increased in accordance with increase of signatures, channel coding can be applied for the transmitter. If channel coding is performed, time/frequency diversity can be obtained through an interleaver. Also, bit to signature mapping can be performed to minimize a bit error rate. In this case, Gray mapping can be used. The sequence which has undergone this procedure is mixed with CAZAC and then transmitted.

The receiver detects CAZAC ID, and calculates a log-likelihood ratio (LLR) for each of bits. Then, the receiver decodes transmission data through a channel decoder. Considering complexity according to sequence search of the receiver configured as shown in FIG. 22, the transmitter preferably uses an exponential sequence as a signature sequence. In this case, the receiver can simply search CAZAC ID through phase difference Fourier Transform. Afterwards, the receiver can again simply calculate LLR from the signature through Fourier Transform.

According to the present invention, the structure on the frequency axis/time axis of the RACH can be identified more definitely. Also, since the RACH resource is divisionally distributed for each frame, even though the user equipment fails to access a specific RACH, the user equipment can directly access RACH of the next frame, whereby access to the base station is improved. Moreover, the user equipment can easily access the RACH even in case of a traffic area of which QoS condition is strict.

Furthermore, according to the present invention, since information is transmitted and received between the user equipment and the base station by using the code sequence, time/frequency diversity can be maximized, and performance attenuation due to influence of channel can be alleviated through the signature manner.

According to the present invention, since the total length of the corresponding sequence can be used with maintaining the advantage of the code sequence according to the related art, data transmission can be performed more efficiently. Also, since the code sequence undergoes predetermined data processing, the quantity of information to be transmitted can be increased and the transmitted data becomes robust to noise or channel.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless communication system such as a mobile communication system or a wireless Internet system.

The invention claimed is:

1. A method for transmitting a preamble sequence from user equipment to a base station to at least improve detection performance, the method comprising:
   generating, by the user equipment, a specific sequence, having a length (L), from a Zadoff-Chu Constant Amplitude Zero Auto Correlation (CAZAC) sequence;
   applying, by the user equipment, a circular shift to the specific sequence by multiplying the specific sequence by an exponential sequence;
   repeating, by the user equipment, the circular-shifted specific sequence to generate a consecutive sequence having a length (N*L), wherein N is an integer greater than 1;
   generating, by the user equipment, the preamble sequence by concatenating a single cyclic prefix (CP) to a front end of the consecutive sequence; and
   transmitting, by the user equipment, on a random access channel, the preamble sequence to the base station to access a cellular network.

2. The method of claim 1, wherein the preamble sequence causes a reduction in access time.

3. The method of claim 1, wherein the random access channel allows the user equipment to access a network in a state where the user equipment is not uplink synchronized with the base station.

4. The method of claim 1, further comprising transmitting, by the user equipment, the preamble for a predetermined time period through a frequency band.

5. The method of claim 1, further comprising transmitting, by the user equipment, a pilot including channel quality information.

6. The method of claim 1, wherein a preamble, synchronization timing information, pilot information, uplink resource allocation information and messages are also transmitted by the user equipment on the random access channel.

7. The method of claim 6, wherein the preamble and the messages are separately transmitted through the random access channel.

8. The method of claim 1, wherein the preamble is a repetitive pattern.

9. A system that transmits a preamble sequence to a base station to at least improve detection performance, the system comprising:
   user equipment adapted to:
      generate a specific sequence, having a length (L), from a Zadoff-Chu Constant Amplitude Zero Auto Correlation (CAZAC) sequence;
      apply a circular shift to the specific sequence by multiplying the specific sequence by an exponential sequence;
      repeat the circular-shifted specific sequence to generate a consecutive sequence having a length (N*L), wherein N is an integer greater than 1; and
      generate the preamble sequence by concatenating a single cyclic prefix (CP) to a front end of the consecutive sequence; and
   a transmitter in the user equipment adapted to transmit, on a random access channel, the preamble sequence to the base station to access a cellular network.

10. The system of claim 9, wherein the preamble sequence causes a reduction in access time.

11. The system of claim 9, wherein the random access channel allows the user equipment to access a network in a state where the user equipment is not uplink synchronized with the base station.

12. The system of claim 9, wherein the user equipment is further adapted to transmit the preamble for a predetermined time period through a frequency band.

13. The system of claim 9, wherein the user equipment is further adapted to transmit a pilot including channel quality information.

14. The system of claim 9, wherein a preamble, synchronization timing information, pilot information, uplink resource allocation information and messages are also transmitted by the user equipment on the random access channel.

15. The system of claim 14, wherein the user equipment is adapted to transmit the preamble and the messages separately through the random access channel.

16. The system of claim 9, wherein the preamble is a repetitive pattern.

17. A non-transitory computer readable information storage media including instructions, that when executed by one or more processors, cause to be performed a method for transmitting a preamble sequence from user equipment to a base station to at least improve detection performance, the method comprising:
   generating, by the user equipment, a specific sequence, having a length (L), from a Zadoff-Chu Constant Amplitude Zero Auto Correlation (CAZAC) sequence;
   applying, by the user equipment, a circular shift to the specific sequence by multiplying the specific sequence by an exponential sequence;
   repeating, by the user equipment, the circular-shifted specific sequence to generate a consecutive sequence having a length (N*L), wherein N is an integer greater than 1;
   generating, by the user equipment, the preamble sequence by concatenating a single cyclic prefix (CP) to a front end of the consecutive sequence; and
   transmitting, by the user equipment, on a random access channel, the preamble sequence to the base station to access a cellular network.

18. The media of claim 17, wherein the preamble sequence causes a reduction in access time.

19. The media of claim 17, wherein the random access channel allows the user equipment to access a network in a state where the user equipment is not uplink synchronized with the base station.

20. The media of claim 17, wherein the method further comprises transmitting, by the user equipment, the preamble for a predetermined time period through a frequency band.

21. The media of claim 17, wherein the method further comprises transmitting, by the user equipment, a pilot including channel quality information.

22. The media of claim 17, wherein a preamble, synchronization timing information, pilot information, uplink resource allocation information and messages are also transmitted by the user equipment on the random access channel.

23. The media of claim 22, wherein the method further comprises separately transmitting, by the user equipment, the preamble and the messages through the random access channel.

24. The media of claim 17, wherein the preamble is a repetitive pattern.

* * * * *